United States Patent
Kato et al.

(10) Patent No.: US 8,396,032 B2
(45) Date of Patent: Mar. 12, 2013

(54) BASE STATION DEVICE, MOBILE STATION DEVICE, COMMUNICATION SYSTEM AND COMMUNICATION METHOD

(75) Inventors: Yasuyuki Kato, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 12/665,634

(22) PCT Filed: Mar. 14, 2008

(86) PCT No.: PCT/JP2008/054757
§ 371 (c)(1),
(2), (4) Date: Dec. 18, 2009

(87) PCT Pub. No.: WO2008/155935
PCT Pub. Date: Dec. 24, 2008

(65) Prior Publication Data
US 2010/0188982 A1  Jul. 29, 2010

(30) Foreign Application Priority Data
Jun. 19, 2007 (JP) .................... 2007-161020

(51) Int. Cl.
*H04W 4/00* (2009.01)
(52) U.S. Cl. .................................................. 370/329
(58) Field of Classification Search .............. 370/328, 370/329, 350, 503; 455/502
See application file for complete search history.

(56) References Cited

U.S. PATENT DOCUMENTS

| | | | |
|---|---|---|---|
| 8,126,021 B2* | 2/2012 | Wang et al. | 370/530 |
| 2010/0178920 A1* | 7/2010 | Kitazoe et al. | 455/436 |
| 2011/0280210 A1* | 11/2011 | Zhang et al. | 370/329 |
| 2012/0087328 A1* | 4/2012 | Park et al. | 370/329 |

FOREIGN PATENT DOCUMENTS

| | | |
|---|---|---|
| CN | 1134206 A | 10/1996 |
| JP | 8-23319 A | 1/1996 |
| JP | 10-163925 A | 6/1998 |
| WO | 95/12940 A1 | 5/1995 |

OTHER PUBLICATIONS

European Search Report issued in European Patent Application No. 08722153.7 on Apr. 4, 2012.
LG Electronics Inc: "Consideration on ARQ Mechanism", 3GPP Draft; R2-062777 Consideration on ARQ Mechanism, 3RD Generation Partnership Project (3GPP), Mobile Competence Centre, 650, Route Des Lucioles; F-06921 Sophia-Antipolis Cedex, France, vol. RAN WG2, No. Seoul, Korea; Oct. 5, 2006 XP050132306[retrieved on Oct. 5, 2006].
Nortel Networks: "Consideration on UL RACH scheme for LTE", 3GPP Draft; R1-060653 RACH, 3rd Generation Partnership Project (3GPP), Mobile Competence Centre, 650, Route Des Lucioles; F-06921 Sophia-Antipolis Cedex; France, vol. RAB WG1, No. Denver, USA; Feb. 9, 2006, XP050101574, [retrieved on Feb. 9, 2006].

(Continued)

*Primary Examiner* — Kerri Rose
(74) *Attorney, Agent, or Firm* — Birch, Stewart, Kolasch & Birch, LLP

(57) ABSTRACT

A base station device which communicates with a mobile station device, comprising an uplink synchronization managing unit which manages uplink synchronization maintenance status of the mobile station device, and a transmitting unit which transmits a synchronization recovery request to the mobile station which is in the uplink synchronization maintenance status.

3 Claims, 25 Drawing Sheets

OTHER PUBLICATIONS

3GPP TS (Technical Specification) 36.211, V1.1.0 (May 2007), 3rd Generation Partnership Project; Technical Specification Group Radio Access Network; Physical Channels and Modulation (Release 8).

3GPP TS (Technical Specification) 36.212, V1.2.0 (May 2007), 3rd Generation Partnership Project; Technical Specification Group Radio Access Network; Multiplexing and channel coding (Release 8).

R2-072338, "Update on Mobility, Security, Random Access Procedure, etc", 3GPP TSG-RAN WG2 Meeting #58, Kobe, Japan, May 7-11, 2007.

3GPP TR 25.814 (Technical Report) 25.814 V7.0.0 (Jun. 2006) 3rd Generation Partnership Project; Technical Specification Group Radio Access Network; Physical layer aspects for evolved Universal Terrestrial Radio Access (UTRA) (Release 7).

* cited by examiner

BASE STATION DEVICE, MOBILE STATION DEVICE, COMMUNICATION SYSTEM AND COMMUNICATION METHOD

TECHNICAL FIELD

The present invention relates to a base station device, a mobile station device, a communication system and a communication method.

Priority is claimed on Japanese Patent Application No. 2007-161020, filed Jun. 19, 2007, the contents of which are incorporated herein by reference.

BACKGROUND ART

In 3GPP (3rd Generation Partnership Project), W-CDMA (Wideband Code Division Multiple Access) is standardized as a third generation cellular mobile communication system. Then, W-CDMA's service is sequentially started. In addition, HSDPA (High Speed Downlink Packet Access) which has further increased communication speed, is also standardized. Then, HSDPA's service will be started.

In the 3GPP, the evolution of third generation wireless access (EUTRA: Evolved Universal Terrestrial Ratio Access) is discussed.

In a downlink of the EUTRA, an OFDM (Orthogonal Frequency Division Multiplexing) system is proposed. In addition, as an uplink of the EUTRA, a single carrier communication system of a DFT (Discrete Fourier Transform)-spread OFDM system is proposed.

As shown in FIG. 20, a base station BS performs wireless communications with a plurality of mobile station devices MS1, MS2 and MS3. The downlink of the EUTRA includes a downlink pilot channel DPich, a downlink synchronization channel DSCH, a physical downlink control channel PDCCH, a physical downlink shared channel PDSCH and a common control physical channel CCPCH.

The uplink of the EUTRA includes an uplink pilot channel UPiCH, a random access channel RACH, a physical uplink shared channel PUSCH and a physical uplink control channel PUCCH (Non-Patent Documents 1 and 2).

As the random access channel RACH, there are a non-synchronization random access channel and a synchronization random access channel. A minimum unit of the non-synchronization random access channel uses 1.25 MHz band, prepares a plurality of channels for access, and copes with a plurality of accesses. FIG. 21 is one example.

In FIG. 21, the horizontal axis is time, and the longitudinal axis is frequency. FIG. 21 represents one communication frame of the uplink. The frame is divided into a plurality of resource blocks. One resource block comprises 1 ms of time and 1.25 band of frequency. The random access channel is assigned to the resource blocks shown in the left-diagonal-line-hatched regions. The uplink common channel is assigned to the resource blocks which shown in the blank regions. The uplink control channel is assigned to the resource blocks which shown in the right-diagonal-line-hatched regions.

A purpose of the non-synchronization random access channel is to synchronize the mobile station device and the base station device, and it is possible to shorten the connection time by transmitting a few bits which are a scheduling request for assigning wireless resources. In addition, a purpose of the synchronization random access is to request scheduling (Non-Patent Document 2).

As a non-synchronization access, there are two access methods (a contention based random access and a non-contention base random access). The contention based random access is random access which may cause contention between mobile station devices, is usually performed. The non-contention based random access is random access which does not cause contention, and is performed in a special case for rapidly synchronizing the mobile station device and the base station device by a instruction of the base station device.

In non-synchronization random access, a preamble is only transmitted for synchronizing an uplink. The preamble includes a signature which is a signal pattern representing information, and is able to represent few bit information by using dozens of signatures. If six bit information is transmitted, 64 kinds of signatures are used.

In the six bit information, five bits are assigned a random ID (Identity), and rest one bit is assigned information (for example, pass loss, CQI (Channel Quality Indicator of downlink)) (Non-Patent Document 3).

FIG. 22 is a processes of the contention random access of the non-synchronization random access.

First, the mobile station device selects a signature among a random ID, a pass loss/CQI of downlink, and transmits a random access preamble using the non-synchronization random access channel of downlink (process PRC 1001). When the base station device receives the preamble from the mobile station device, the base station device calculates a synchronization timing shift between the mobile station device and the base station device based on the preamble. Then the base station device performs scheduling for transmitting a L2/L3 (Layer 2/Layer 3). Then the base station device assigns a temporary C-RNTI to the mobile station device which needs C-RNTI (Cell-Ratio Network Temporary Identity) based on a random access reason in the random access preamble. Then the base station device transmits synchronization timing shift information, scheduling information, and a random access response which includes the C-RNTI and a signature ID number (process PRC 1002).

The mobile station device abstracts response of the base station which includes transmitted a signature ID. Then, the mobile station device transmits the L2/L3 message using wireless recourse scheduled based on the scheduling information (process PRC 1003). The base station device receives the L2/L3 message form the mobile station device, and transmits, to the mobile station device, a contention resolution for determining whether or not contention has occurred between mobile station devices (process PRC 1004). This technology is disclosed in the Non-Patent Document 3.

FIG. 23 shows processes of non-contention random access of the non-synchronization random access.

First, the base station device selects a signature and transmits it to the mobile station device (process PRC 2001). The mobile station device transmits a random access preamble on a non-synchronization random access channel using a sent signature (process PRC 2002). The base station device calculates the synchronization timing shift between the mobile station device and the base station device when the base station device receives the preamble from the mobile station device, and transmits a random access response which includes a C-RNTI or an RA-RNTI (Random Access-Radio Network Temporary Identity) (process PRC 2003). The mobile station device corrects the synchronization timing shift based on the received message 3 (Non-Patent Document 3). The C-RNTI or RA-RNTI is one kind of identification.

As the uplink pilot channel UPiCH, there are two kind of reference signals. In other words, there is a reference signal which is used for measuring (sounding Reference Signal) and a reference signal for demodulating (demodulated Reference signal). The reference signal which is used for measuring is used as a reference signal which estimates a channel for scheduling of an uplink. The reference signal which is used for measuring is used to perform data scheduling. Therefore, the reference signal which is used for measuring is assigned a wide transmission band which is wider than a band of data transmission, and is regularly and separately transmitted from data transmission. The reference signal which is used for measuring is described later.

The reference signal for demodulating is used as a reference signal which estimates a channel for scheduled data demodulation. The reference signal for demodulating is used to perform data demodulation. Therefore the reference signal for demodulating is only transmitted in a transmission band which is same as a band of data.

The uplink pilot channel UPiCH may be used to perform synchronization maintenance of an uplink between a mobile station device which transmits data in the uplink and a base station device. The base station device calculates a synchronization timing shift between the mobile station device and the base station device based on the uplink pilot channel UPiCH like a preamble of the random access channel RACH, and sends the synchronization timing shift information to the mobile station device (Non-Patent Document 4).

FIG. 24 is a diagram showing each state transition of an uplink synchronization establishment, a synchronization maintenance and a synchronization deviation. FIG. 25 is a diagram showing the synchronization maintenance in detail.

First, in FIG. 24, the mobile station device performs a non-synchronization random access of contention random access, and synchronizes the base station device and the mobile station device of the uplink (process PRC 3001). While uplink data is transmitted, only the base station device manages the uplink synchronization, and the base station device measures the uplink pilot channel UPiCH (especially, a reference signal which is used for measuring) and calculates a synchronization timing shift, and the uplink synchronization maintained by the base station device sends the synchronization timing shift information to the mobile station device (process PRC 3002). If data transmission is finished, a synchronization management of the uplink is performed by the base station device and the mobile station device, and the synchronization is maintained for a predetermined period (process PRC 3003). After the predetermined period is over (process PRC 3004), the synchronization is deviated, and the mobile station device performs non-synchronization random access again to synchronize (process PRC 3004).

The uplink control channel PUCCH is used to transmit ACK (Acknowledgment)/NACK (Negative Acknowledgment) for the downlink data, or is used to transmit a CQI of the downlink for a downlink data scheduling.

The retransmission number is decreased by using HARQ (Hybrid Automatic Repeat reQuest) to data packet of the uplink common channel PUSCH, and by increasing error correction ability of retransmission. In common ARQ (Automatic Repeat reQuest), if an error occurs in receiving packet data, the error-containing packet is destroyed, and the retransmission of the same packet is requested. In contrast, high speed hybrid automatic repeat request is a technique for performing the error recovery by storing the error-containing packet and synthesizing the retransmitted packet data. In a high speed hybrid automatic repeat request, there is a chase synthesis and an IR (Incremental Redundancy) synthesis.

Non-Patent Document 1: 3GPP TS (Technical Specification) 36.211, V1.10 (2007-05), Technical Specification Group Radio Access Network, Physical Channel and Modulation (Release 8)

Non-Patent Document 2: 3GPP TS (Technical Specification) 36.212, V1.20 (2007-05), Technical Specification Group Radio Access Network, Multiplexing and channel coding (Release 8)

Non-Patent Document 3: R2-072338 "Update on Mobility, Security, Random Access Procedure, etc", 3GPP TSG RAN WG2 Meeting #58 Kobe, Japan, 7-11 May, 2007

Non-Patent Document 4: 3GPP TR (Technical Report) 25.814, V7.0.0 (2006-06), Physical layer aspects for evolved Universal Terrestrial Radio Access (UTRA)

DISCLOSURE OF INVENTION

Problem to be Solved by the Invention

However, in a conventional technique, which the uplink data is transmitted, the synchronization management of the uplink is only performed in the base station device, and the synchronization updating is performed regularly. As shown in FIG. 25, changing from the non-synchronization state to the synchronization state is performed by transmitting the preamble from the mobile station device to the base station device and the base station device performs a preamble response.

Hereinafter, after a predetermined time measured by a synchronization timer of the base station device is lapsed, the base station device transmits the synchronization information (information relating to the synchronization timing shift) to the mobile station device. The mobile station device maintains the synchronization by adjusting the data transmitting timing and performing synchronization correction using the synchronization information. The synchronization correction is performed repeatedly, whenever the synchronization timer measures the predetermined time.

In addition, a method of detecting the deviation of uplink synchronization is only performed after the predetermined time has lapsed and after the uplink data is transmitted.

However, as shown in FIG. 26, by reason of the synchronization deviation during transmission of the uplink data and by various other reasons, there is a case of synchronization deviation of the uplink. In this case, the base station device and the mobile station device do not detect the synchronization deviation, and the transmission of data from the mobile station device fails for a long period time. FIG. 26 represents this case. If the data transmissions from the mobile station device fails repeatedly and the synchronization is not recovered, the synchronization process is not performed while the synchronization timer of the base station device is not measuring the predetermined time. After the predetermined time has lapsed, the base station device and the mobile station device determines detects that wireless link is disconnected, and the mobile station device starts the synchronization process of the downlink (receiving downlink synchronization channel DSCH) or the synchronization process of the uplink. Therefore, the base station device reconnects to the base station device, and the time until transmitting the uplink data is wasted. To prevent this wasted process, it is necessary to provide means for recovering the synchronization early by detecting the deviation of the synchronization of the uplink by the base station device or the mobile station early.

The present invention is created in light of the aforementioned circumstances, and an object thereof is to provide a base station device, a mobile station device, a communication system and a communication method capable of detecting a synchronization deviation by the base station device or the mobile station device early, and recovering from the non-synchronization state to the synchronization state early, if an uplink synchronization is deviated from.

Means for Solving the Problem (1) According to one aspect of the present invention, there is provided a base station device which communicates with a mobile station device, comprising: an uplink synchronization managing unit which manages uplink synchronization maintenance status of the mobile station device; and a transmitting unit which transmits a synchronization recovery request to the mobile station which is in the uplink synchronization maintenance status.

(2) Moreover, in the above described base station device, further comprising: a signal receiving unit which receives a signal transmitted by the mobile station device; and an uplink resynchronization factor detecting unit which detects an uplink resynchronization factor based on the signal received by the signal receiving unit, wherein the transmitting unit transmits the synchronization recovery request to the mobile station device, when the uplink resynchronization factor is detected.

(3) Moreover, in the above described base station device, wherein the uplink resynchronization factor detecting unit determines that the uplink resynchronization factor is detected, when the signal transmitted by the mobile station device is not normally received.

(4) Moreover, in the above described base station device, wherein the uplink resynchronization factor detecting unit determines that the uplink resynchronization factor is detected, when the number of not receiving a reference signal from the signal transmitted by the mobile station device is over a predetermined number.

(5) Moreover, in the above described base station device, wherein the uplink resynchronization factor detecting unit determines that the uplink resynchronization factor is detected, when the number of not receiving a control signal from the signal transmitted by the mobile station device is over a predetermined number.

(6) Moreover, in the above described base station device, wherein the transmitting unit transmits a retransmission request of the signal to the mobile station device, when the number of measurements by the uplink resynchronization factor detecting unit is less than predetermined number.

(7) According to another aspect of the present invention, there is provided a mobile station device which communicates a base station device, comprising: a signal transmitting unit which transmits a signal to the base station device; a synchronization recovery request receiving unit receives a synchronization recovery request transmitted by the base station device; and a synchronization signal transmitting unit which transmits a synchronization signal to the base station device, when the synchronization recovery request receiving unit receives the synchronization recovery request.

(8) Moreover, in the above described mobile station device, further comprising: a retransmission request receiving unit which receives a retransmission request transmitted by the base station device; and a signal retransmitting unit which retransmits the signal transmitted by the signal transmitting unit to the base station, when the retransmission request receiving unit receives the retransmission request.

(9) According to another aspect of the present invention, there is provided a mobile station device which communicates to a base station device, comprising: an uplink synchronization managing unit which manages an uplink synchronization maintenance status of the mobile station device; and a transmitting unit which transmits a synchronization signal to the base station device, when a status is the uplink synchronization maintenance status.

(10) Moreover, in the above described mobile station device, further comprising: a signal receiving unit which receives the signal transmitted by the base station device; and an uplink resynchronization factor detecting unit which detects the uplink resynchronization factor based on the signal received by the signal receiving unit, wherein the transmitting unit transmits the synchronization signal to the base station device, when the uplink resynchronization factor is detected.

(11) Moreover, in the above described mobile station device, wherein the uplink resynchronization detecting unit determines that the uplink resynchronization factor is detected, when the number of determining the signal transmitted by the base station device as retransmission request is over predetermined number.

(12) Moreover, in the above described mobile station device, wherein the uplink resynchronization factor detecting unit determines that the uplink resynchronization factor is being detected, when the number of determining the signal transmitted by the base station as the signal which indicates that the signal is not able to receive is over predetermined number.

(13) Moreover, in the above described mobile station device, wherein the uplink resynchronization factor detecting unit determines that the uplink resynchronization factor is detected, when the number of not detecting the signal of a broadcast channel from the signal transmitted by the base station device is over predetermined number.

(14) According to another aspect of the present invention, there is provided a communication system which comprises a base station device and a mobile station device, the base station device comprising: an uplink synchronization managing unit which manages an uplink synchronization maintenance status of the mobile station device; and a transmitting unit which transmits a synchronization recovery request to the mobile station device which is in the uplink synchronization maintenance status, the mobile station device comprising: a signal transmitting unit which transmits a signal to the base station; a synchronization recovery request receiving unit which receives the synchronization recovery request transmitted by the base station device; and a synchronization signal transmitting unit which transmits the synchronization signal to the base station device, when the synchronization recovery request receiving unit receives the synchronization recovery request.

(15) According to another aspect of the present invention, there is provided a communication method using a base station device and a mobile station device, the base station device comprising: an uplink synchronization managing step which manages an uplink synchronization maintenance status of the mobile station device; and a transmitting step which transmits a synchronization recovery request to the mobile station device which is in the uplink synchronization maintenance status, the mobile station device comprising: a signal transmitting step which transmits a signal to the base station; a synchronization recovery request receiving step which receives the synchronization recovery request transmitted by the base station device; and a synchronization signal transmitting step which transmits the synchronization signal to the base station device, when the synchronization recovery request receiving step receives the synchronization recovery request.

Effect of the Invention

The present invention make is possible to obtain the base station device, the mobile station device, the communication system and the communication method capable of detecting a synchronization deviation by the base station device or the mobile station device early, and recovering from the non-synchronization state to the synchronization state early, if an uplink synchronization is deviated from.

REFERENCE SYMBOLS 11a to 11d data controlling unit,
12a to 12d OFDM modulating unit,
13a to 13d scheduling unit,
14a to 14d channel estimating unit,
15a to 15d DFT-S-OFDM demodulating unit,
16a to 16d control data abstracting unit,
17a to 17d preamble detecting unit,
18a to 18d signature managing unit,
19a to 19d wireless unit,
21a to 21d DL scheduling unit,
22a to 22d UL scheduling unit,
23a to 23d message generating unit,
24a to 24c resynchronization factor detecting unit,
25a to 25c UL synchronization managing unit,
51a, 51d, 51e data controlling unit,
52a, 52d, 52e DFT-S-OFDM modulating unit,
53a, 53d, 53e scheduling unit,
54a, 54d, 54e OFDM demodulating unit,
55a, 55d, 55e channel estimating unit,
56a, 56d, 56e controlling data abstracting unit,
57a, 57d, 57e synchronization correcting unit,
58a, 58d, 58e preamble generation unit,
59a, 59d, 59e signature selecting unit,
60a, 60d, 60e wireless unit,
61d, 61d UL scheduling unit,
62d, 62e resynchronization factor detecting unit,
63e, 63e UL synchronization managing unit,
101a to 101e base station device,
102a to 102e mobile station device

BEST MODE FOR CARRYING OUT THE INVENTION

First Embodiment

Figure 1:
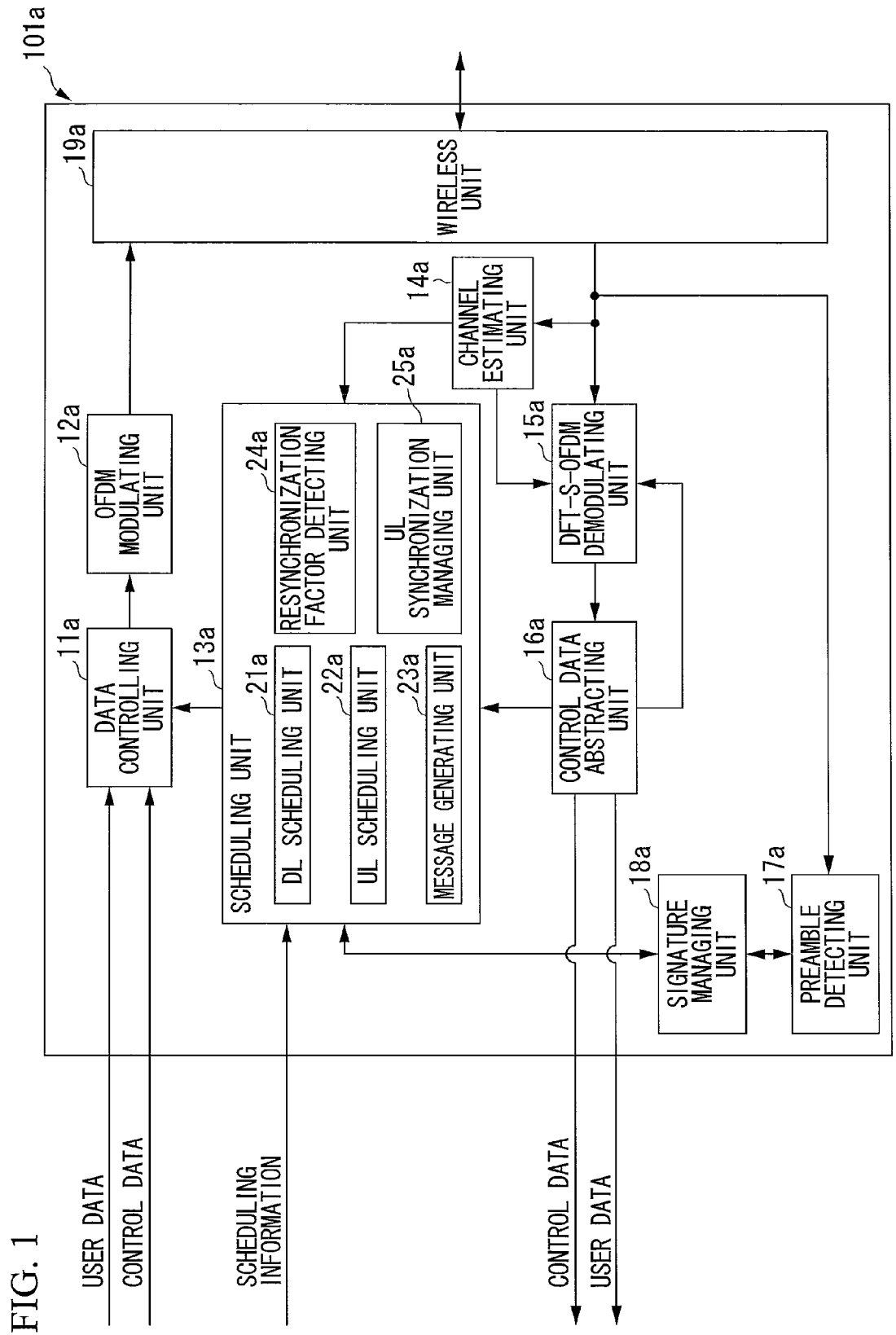
FIG. 1 is a block diagram showing a configuration of a base station device of a communication system according to a first embodiment of the present invention.

FIG. 1 is a diagram showing a configuration of a base station device 101a of a communication system according to a first embodiment of the present invention. In FIG. 1, the base station device 101a includes a data controlling unit 11a, an OFDM modulating unit 12a, a scheduling unit 13a, a channel estimating unit 14a, a DFT-S (spread)-OFDM demodulating unit 15a, a control data abstracting unit 16a, a preamble detecting unit 17a, a signature managing unit 18a, a wireless unit 19a (also called a signal receiving unit and a transmitting unit). The scheduling unit 13a includes a DL (Down Link) scheduling unit 21a, an UP (Up Link) scheduling unit 22a, a message generating unit 23a, a resynchronization factor detecting unit 24a and a UL (Up Link) synchronization managing unit 25*a* (also called uplink synchronization managing unit).

The data controlling unit 11*a* performs a mapping of control data to the common control channel CCPCH, the downlink synchronization channel DSCH, the downlink pilot channel DPiCH, the downlink common channel PDSCH and the downlink control channel PDCCH by an instruction from the scheduling unit 13*a*. The data controlling unit 11*a* also performs a mapping of a transmission data for each mobile station device 102*a* to the downlink common channel PDSCH.

The OFDM modulating unit 12*a* performs serial/parallel conversion for the output signal of the data controlling unit 11*a*, performs IFFT (Inverse Fast Fourier Transform), performs CP (Cyclic Prefix) insertion, and performs filtering as an OFDM signal processing. Therefore, an OFDM signal is generated.

The wireless unit 19*a* performs up-conversion from OFDM-demodulated data to wireless frequency, and transmits the signal to the mobile station device 102*a* via an antenna (not shown). In addition, if the number of measuring by the resynchronization factor detecting unit 25*a* of the scheduling unit 13*a* is over a predetermined number, the wireless unit 19*a* transmits a synchronization recovery request to the mobile station device 102*a*. In addition, if the number of measuring by the resynchronization factor detecting unit 25*a* is less than the predetermined number, the wireless unit 19*a* transmits a retransmission request of the signal to the mobile station device 102*a*. In other words, each signal of the synchronization recovery request and the retransmission request are supplied to the data controlling unit 11*a*, and are performed a mapping to the downlink common channel or the downlink control channel, and are transmitted to the mobile station device 102*a* via the OFDM modulating unit 12*a* and the wireless unit 14*a*.

In addition, the wireless unit 19*a* receives the signal transmitted by the mobile station device 102*a*. Specifically, the wireless unit 19*a* receives the uplink data transmitted by the mobile station device 102*a*, and performs a down-convert to the baseband signal, and supplies the reception data to the DFT-S-OFDM demodulating unit 15*a*, the channel estimating unit 14*a* and the preamble detecting unit 17*a*.

The channel estimating unit 14*a* estimates wireless channel characteristics based on the reference signal for demodulating of the uplink pilot channel UPiCH, and supplies the wireless channel estimation result to the DFT-spread OFDM demodulating unit 15*a*. The wireless channel estimation result is supplied to the scheduling unit 13*a* to schedule the uplink based on a reference signal which is used for measuring of the uplink pilot channel UPiCH. In addition, the synchronization timing shift is calculated by measuring the uplink pilot channel UPiCH regularly, the synchronization timing shift is supplied to the scheduling unit 13*a*. Here, the uplink communication system is a single carrier system (for example, DFT-spread OFDM), however, a multi carrier system (for example, OFDM system) may be used.

The control data abstracting unit 16*a* confirms whether or not the reception signal includes errors, and sends the confirmed result to the scheduling unit 13*a*. If the reception data does not include an error, the reception data is separated into user data and a control data. Among the control data, the control data of layer 2 (for example, the CQI information of the downlink, the ACK/NACK of the downlink) is supplied to the scheduling unit 13*a*, and other control data and user data of the layer 3 are supplied to the upper layer. If the reception data includes errors, the reception data is stored to synthesize to the retransmission data. Then, the retransmission data is received, and the reception data including errors are synthesized with the retransmission data.

The scheduling unit 13*a* includes a downlink scheduling unit 21*a* which performs a scheduling of the downlink, a UL scheduling unit 22*a* which performs a scheduling of the uplink, a message generating unit 23*a*, a resynchronization factor detecting unit 24*a*, and a UL synchronization managing unit 25*a*.

The DL scheduling unit 21*a* performs a scheduling for mapping the user data and control data to each downlink channel based on the CQI information sent by the mobile station device 102*a* (FIG. 3), data information of each user sent by the upper layer of the base station device, and the control data generated by the message generating unit 23*a*.

The UL scheduling unit 22*a* performs a scheduling for mapping the user data to the each uplink channels based on the uplink wireless channel estimation result from the channel estimating unit 14*a* and a resource assignment request from the mobile station device 102*a*.

The message generating unit 23*a* generates control data (for example, an ACK/NACK of uplink data, a preamble response message and a synchronization update request message).

If the data reception fails continuously based on the reception data result from the control data abstracting unit 16*a*, the resynchronization factor detecting unit 24*a* determines that the synchronization of the mobile station device 102*a* is deviated from, and sends to the UL synchronization managing unit 25*a* that the synchronization has been deviated from.

The resynchronization factor detecting unit 24*a* determines whether or not a predetermined condition is fulfilled based on the signal received by the wireless unit 19*a*. In the first embodiment, the resynchronization factor detecting unit 24*a* determines, as the predetermined condition, whether or not the signal transmitted by the mobile station device 102*a* has been received normally. For example, the determination is performed based on whether the decoding of the error correction code is possible or not.

In addition, the resynchronization factor detecting unit 24*a* measures the number which the predetermined condition is fulfilled based on the determination result. In the first embodiment, the resynchronization factor detecting unit 24*a* measures the number that the signal transmitted by the mobile station device 102*a* is not able to normally receive.

The UL synchronization managing unit 25*a* manages an uplink synchronization state of the mobile station device 102*a*. In addition, it supplies the instruction to assign the signature to the signature managing unit 18*a*, and to perform a synchronization update process in the mobile station device 102*a*

Figure 2:
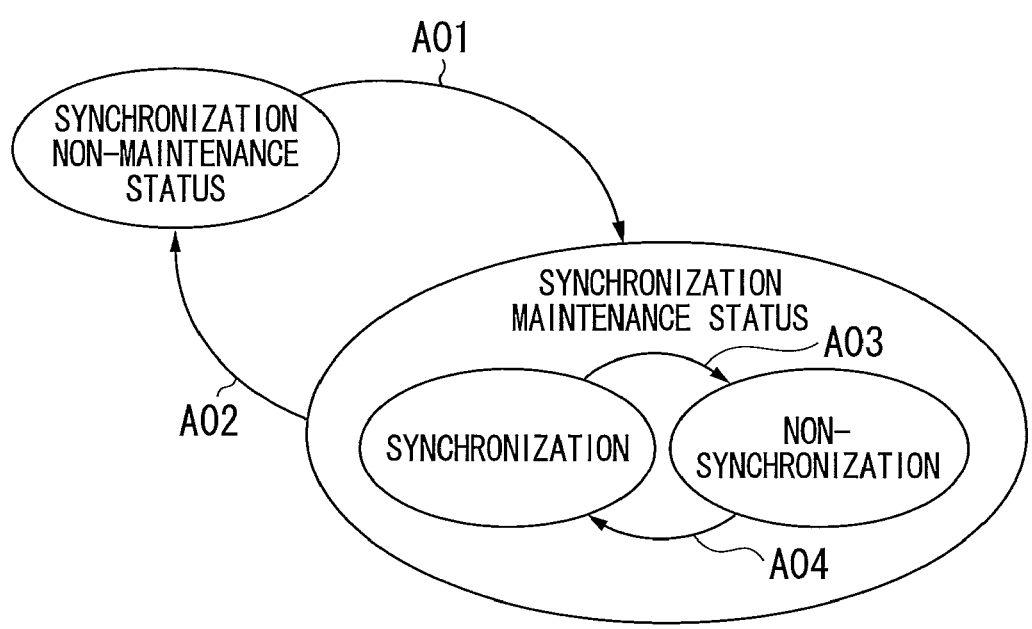
FIG. 2 is a state diagram of a UL synchronization managing unit 25a according to the first embodiment of the present invention.

FIG. 2 is a state diagram of a UL synchronization managing unit 25*a* according to the first embodiment of the present invention. The mobile station device 102*a* performs a random access to the base station device 101*a*. If the base station device 101*a* detects (step A01) the preamble, the state is changed to the synchronization maintenance state. After the communication between the base station device 101*a* and the mobile station device 102*a* is finished and a predetermined time has lapsed (after the synchronization timer measures the predetermined time), a state is changed to the synchronization non-maintenance state.

In the synchronization maintenance state, there is a synchronization state and a non-synchronization state. When a state is changed from the step A01, the synchronization state of the synchronization maintenance is established. While a state is the synchronization state of the synchronization maintenance state, before measurement by the timer is finished, the uplink pilot channel UPiCH is measured, the synchronization information (information relating to the synchronization timing shift) is transmitted to the mobile station, and the synchronization state is maintained. The resynchronization factor detecting unit 24*a* determines that the synchronization is deviated from based on the result of the reception data from the control data abstracting unit 16*a* (step A03), and the state is changed to the non-synchronization state of the synchronization maintenance state.

If the state changes to the non-synchronization state of the synchronization maintenance state, the instruction for assigning the signature is supplied to the signature managing unit 18*a* to perform a synchronization update process, and synchronization update request is transmitted to the mobile station device 102*a*. The mobile station device 102*a* performs random access using the preamble of the signature ID selected by the base station device 101*a*. Then, the preamble of signature ID selected by the base station device is detected by the preamble detecting unit 17*a*. If the preamble response is transmitted to the mobile station device (step A04), the state is changed to the synchronization state of the synchronization maintenance state.

In addition, the synchronization maintenance state is a state where the base station device 101*a* and the mobile station device 102*a* communicate with each other and the mobile station device 102*a* performs reception of the downlink (including control data) and a transmission of the uplink (including control data), or is a state before the synchronization timer expires.

The preamble detecting unit 17*a* detects the preamble transmitted by the mobile station device 102*a* (FIG. 3), and calculates the amount of synchronization timing shift, and reports the signature ID and the amount of synchronization timing shift to the signature managing unit 18*a*.

The signature managing unit 18*a* selects the signature ID based on the instruction from the scheduling unit 13*a*, and sends it to the scheduling unit 13*a*. The selection of the signature ID number is performed by confirming the signature ID number which is currently used by the base station device 101*a*, and by selecting the signature without currently used signatures.

In addition, the signature managing unit 18*a* stores the selected signature ID number as it is currently used. Then the signature managing unit 18*a* deletes the stored contents, because the signature ID number which is detected by the preamble detecting unit 17*a* and is selected by the base station device 101*a* is finished to use. In addition, the signature ID number and the amount of synchronization timing shift are supplied to the scheduling unit 13*a*.

Figure 3:
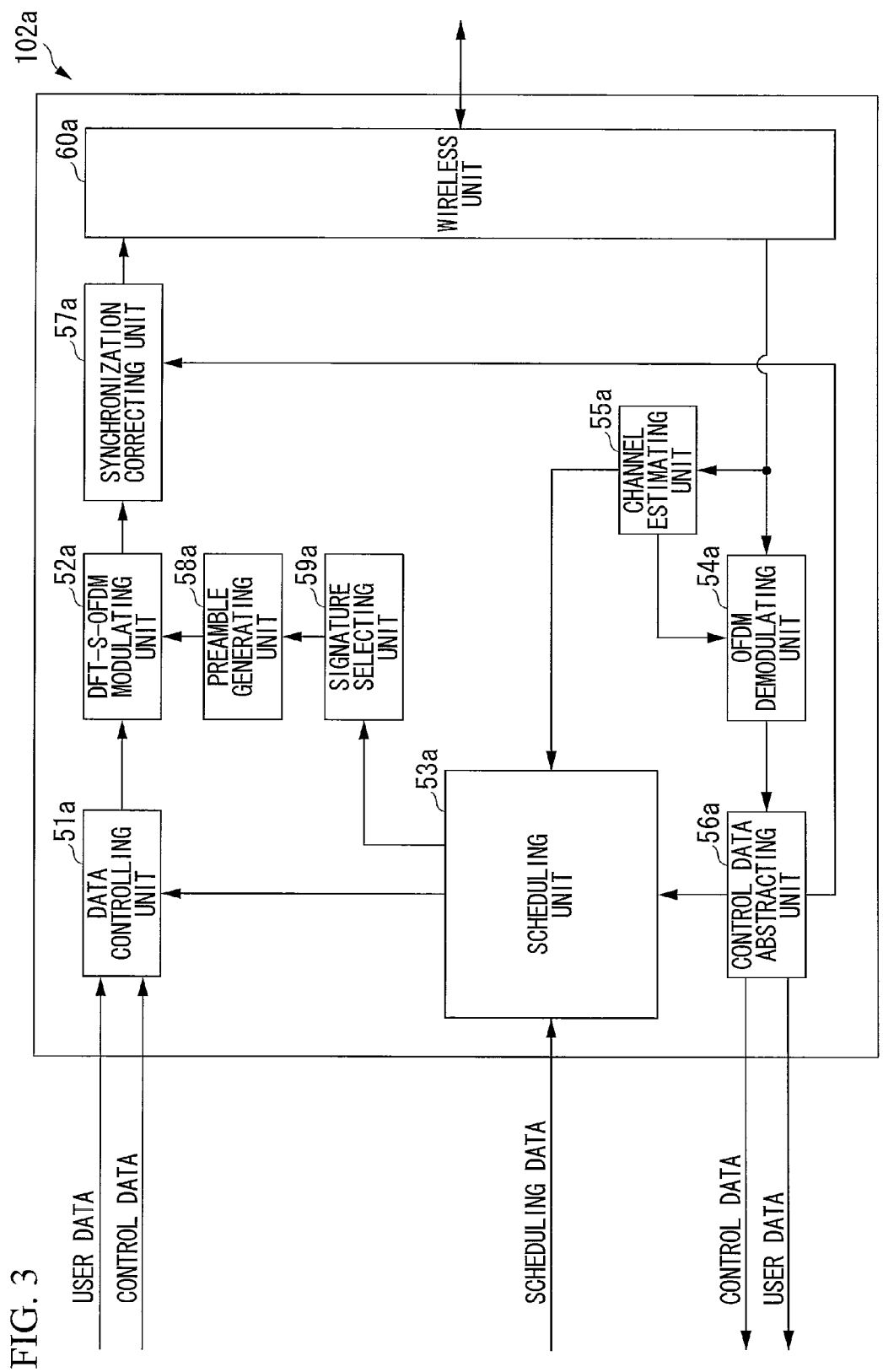
FIG. 3 is a block diagram showing a configuration of a mobile station device of the communication system according to the first embodiment of the present invention.

FIG. 3 is a block diagram showing a configuration of a mobile station device 102*a* of the communication system according to the first embodiment of the present invention. The mobile station device 102*a* includes a data controlling unit 51*a*, a DFT-S-OFDM modulating unit 52*a*, a scheduling unit 53*a*, an OFDM demodulating unit 54*a*, a channel estimating unit 55*a*, a control data abstracting unit 56*a*, a synchronization correcting unit 57*a*, a preamble generating unit 58*a*, a signature selecting unit 59*a* and a wireless unit 60*a* (also called a signal transmitting unit, a synchronization recovery request receiving unit, a synchronization signal transmitting unit, retransmission receiving unit and a signal retransmitting unit).

The user data and the control data are supplied to the data controlling unit 51*a*, the downlink CQI, ACK/NACK are assigned to the uplink control channel PUCCH, and the user data, and the signals excluding the downlink CQI, ACK/NACK are assigned to the uplink common channel based on the instructions from the scheduling unit 53*a* and are then transmitted. In addition, the reference signal which is used for measuring and the reference signal for demodulating are assigned to the uplink pilot channel UPiCH.

The DFT-S-OFDM modulating unit 52*a* performs data modulation, and the modulated signal performs a DFT conversion, a sub-carrier mapping, an IFFT conversion, a CP (Cyclic Prefix) insertion and a filtering as a DFT-S-OFDM signal processing. Therefore, a DFT-Spread-OFDM signal is generated. Here, the communication system of the uplink uses a single carrier system (for example, DFT-spread OFDM). However, a multi carrier system (for example, OFDM system) may be used.

The synchronization correcting unit 57*a* corrects a transmission timing based on the synchronization information outputted from the control data abstracting unit 56*a*, the data which is demodulated to match a transmission timing supplied to the wireless unit 60*a*.

The wireless unit 60*a* transmits a signal to the base station device 101*a* (FIG. 1) via antenna (not shown). Specifically, the wireless unit 60*a* sets a wireless frequency instructed by the wireless controlling unit, and performs up-conversion modulated data to wireless frequency, and transmits it to the base station device 101.

In addition, the wireless unit 60*a* receives the downlink data transmitted by the base station device 101*a*, performs down-conversion to a baseband signal, and supplies the reception data to the OFDM demodulating unit 54*a*.

If the wireless unit 60*a* receives the synchronization request from the base station device, the wireless unit 60*a* transmits the synchronization signal to the base station device 101*a*. If the wireless unit 60*a* receives the retransmission request from the base station device 101*a*, the wireless unit 60*a* retransmits the signal which was transmitted to the base station device 101*a* to the base station device 101*a*.

The channel estimating unit 55*a* estimates wireless channel characteristics based on the downlink pilot channel DPiCH, and supplies the estimated result to the OFDM demodulating unit 54*a*. In addition, the channel estimating unit 55*a* converts it to the CQI information to send the wireless channel estimation result to the base station device 101*a*, and supplies the CQI information to the scheduling unit 53*a*.

The OFDM demodulating unit 54*a* demodulates the reception data based on the wireless channel estimation result of the channel estimating unit 55*a*.

The control data abstracting unit 56*a* separates the reception data into user data and control data. Among the control data, the synchronization information of the uplink supplied to the synchronization correcting unit 57*a*, the scheduling information, the synchronization update request message, and other layer 2 control data are supplied to the scheduling unit 53*a*, and the layer 3 control data and the user data are supplied to the upper layer.

The scheduling unit 53*a* controls the data controlling unit 51*a* based on the control information outputted from the control data abstracting unit 56*a* or the scheduling information outputted from the upper layer. The data controlling unit 51*a* performs a mapping of the user data and the control data which are transmitted by the uplink to each channels. In addition, the scheduling unit 53*a* instructs the signature selecting unit 59*a* to perform a random access based on the instruction from the upper layer. In addition, the scheduling unit 53*a* instructs the signature selecting unit 59*a* to perform a random access using a signature ID which is included in the synchronization update message.

The signature selecting unit 59*a* selects the signature ID number which uses a random access based on the instruction from the scheduling unit 53a, and supplies the selected signature ID number to the preamble generating unit 58a. If the signature ID number receives an instruction from the scheduling unit 53a, the signature selecting unit 59a supplies the instructed signature ID number to the preamble generating unit 58a.

The preamble generating unit 58a generates the preamble based on the signature ID number which is selected by the signature selecting unit 59a, and supplies it to the DFT-S-OFDM modulating unit 52a.

In addition, the mobile station device 102a uses the synchronization state and the non-synchronization state, and the two states are managed by the scheduling unit 53a. If the preamble response which includes a transmitted signature ID number is received, the state is changed from the non-synchronization state to the synchronization state. In addition, if the synchronization timing shift information of the preamble response is set, the state is changed from the non-synchronization state to the synchronization state. Then, the base station device 101a and the mobile station device 102a communicate with each other. If the mobile station device 102a finishes a data transmission of the uplink (including a control data), the state is changed to the non-synchronization state after a predetermined time lapses.

In the first embodiment of the present invention, the resynchronization factor detecting unit 24a is provided in the scheduling unit 13a of the base station device 101a. The resynchronization factor detecting unit 24a determines whether the data reception fails continuously based on the reception result from the control data abstracting unit 16a. If the resynchronization factor detecting unit 24a determines that the data reception fails continuously, the resynchronization factor detecting unit 24a determines that the synchronization has deviated, and sends it to the UL synchronization managing unit 25a. The UL synchronization managing unit 25a controls the mobile station device 102a performs a synchronization update processing.

In other words, in the synchronization state of the uplink, the data transmission from the mobile station device 102a fails, because of rapid change of a wireless channel. However, if a retransmission process is performed a number of times, the data transmission succeeds, because a high speed hybrid automatic repeat request is used. However, in the synchronization deviation state, the data transmission fails, even if retransmission is performed repeatedly, because the transmission timing is deviated from. Therefore, it is determined that the data transmission fails continuously from the result of the reception data. Then, if the base station device 101a fails to perform a data reception continuously n times, it is determined that the synchronization deviation state or the nearly synchronization deviation state, and the base station device orders a (non-contention-based) random access to mobile station device. In addition, if the synchronization process is necessary, it may be determined as the synchronization deviation state or the nearly synchronization deviation state. In the base station, the UL synchronization managing unit 25a determines whether or not the resynchronization process is necessary.

Figure 4:
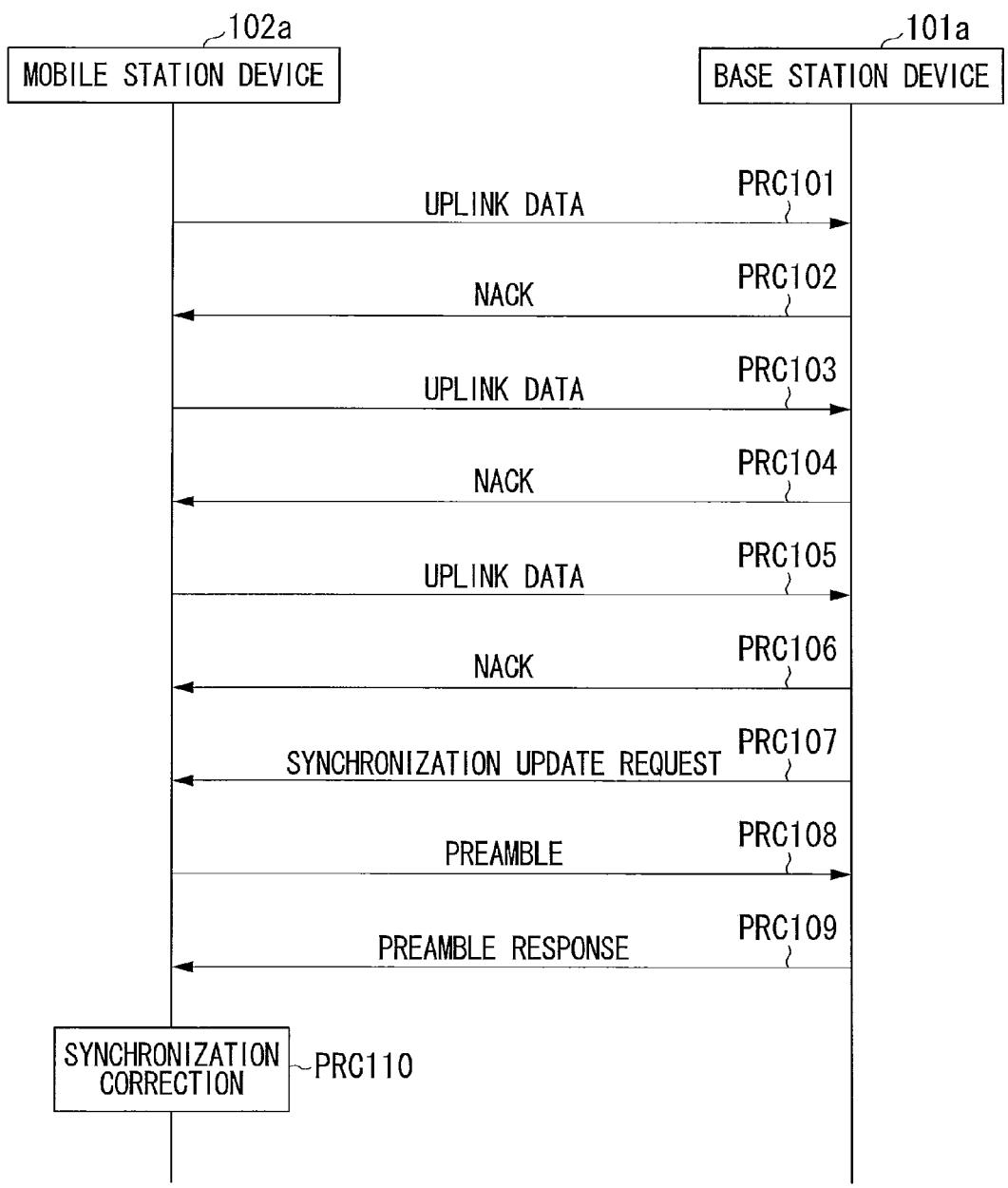
FIG. 4 is a sequence diagram showing communication processes of the communication system according to the first embodiment of the present invention.

An aforementioned control method is described below with reference to FIG. 4. As shown in FIG. 4, the mobile station device 102a transmits the data using the uplink to the base station device 101a (process PRC101). If the base station device 101a fails to receive the data transmitted by the mobile station device 102a, the base station device 101a transmits the negative acknowledgement NACK to the mobile station device 102a using the downlink (process PRC102). In addition, the base station device 101a counts the number of transmissions of the negative acknowledgement NACK.

If the mobile station device 102a receives the negative acknowledgement, the mobile station device 102a transmits retransmission data to the base station device 101a using the uplink (process PRC103). If the base station device 101a fails to receive the data transmitted by the mobile station device 102a again, the base station device 101a transmits the negative acknowledgement NACK to the mobile station device 102a using the downlink again (process PRC104). Then, the mobile station device 102a transmits the retransmission data to the base station device 101a (process PRC105). If the base station device 101a fails to receive the data transmitted by the mobile station device 102a again, the base station device 101a transmits the negative acknowledgement NACK to the mobile station device 102a (process PRC106).

If the base station device 101a fails to receive the data from the mobile station device 102a n times continuously, the base station device 101a selects a signature. Then, the base station device 101a sends a synchronization update request message which includes the signature ID and the C-RNTI using the downlink (process PRC107).

If the mobile station device 102a receives the synchronization update request message, the mobile station device 102a stops to transmit the retransmission data, and transmits the preamble by the random access channel RACH of the uplink using the signature which is included in the synchronization update request message (process PRC108).

If the base station device 101a detects the preamble of the signature selected by the base station device 101a, the base station device 101a calculates a synchronization timing shift, and transmits a preamble response message which includes the C-RNTI and the synchronization timing shift information to the mobile station device 102a using the downlink (process PRC109).

If the mobile station device 102a receives the preamble response, the mobile station device 102a performs a synchronization correction based on the synchronization timing shift information (process PRC110). In other words, the mobile station device corrects a timing of transmitting the user data and the control data based on the synchronization correction. Then, data transmission and data reception between the base station device and the mobile station device are resumed.

In addition, the synchronization update request message may include the time-frequency location of the using random access channel RACH.

Figure 5:
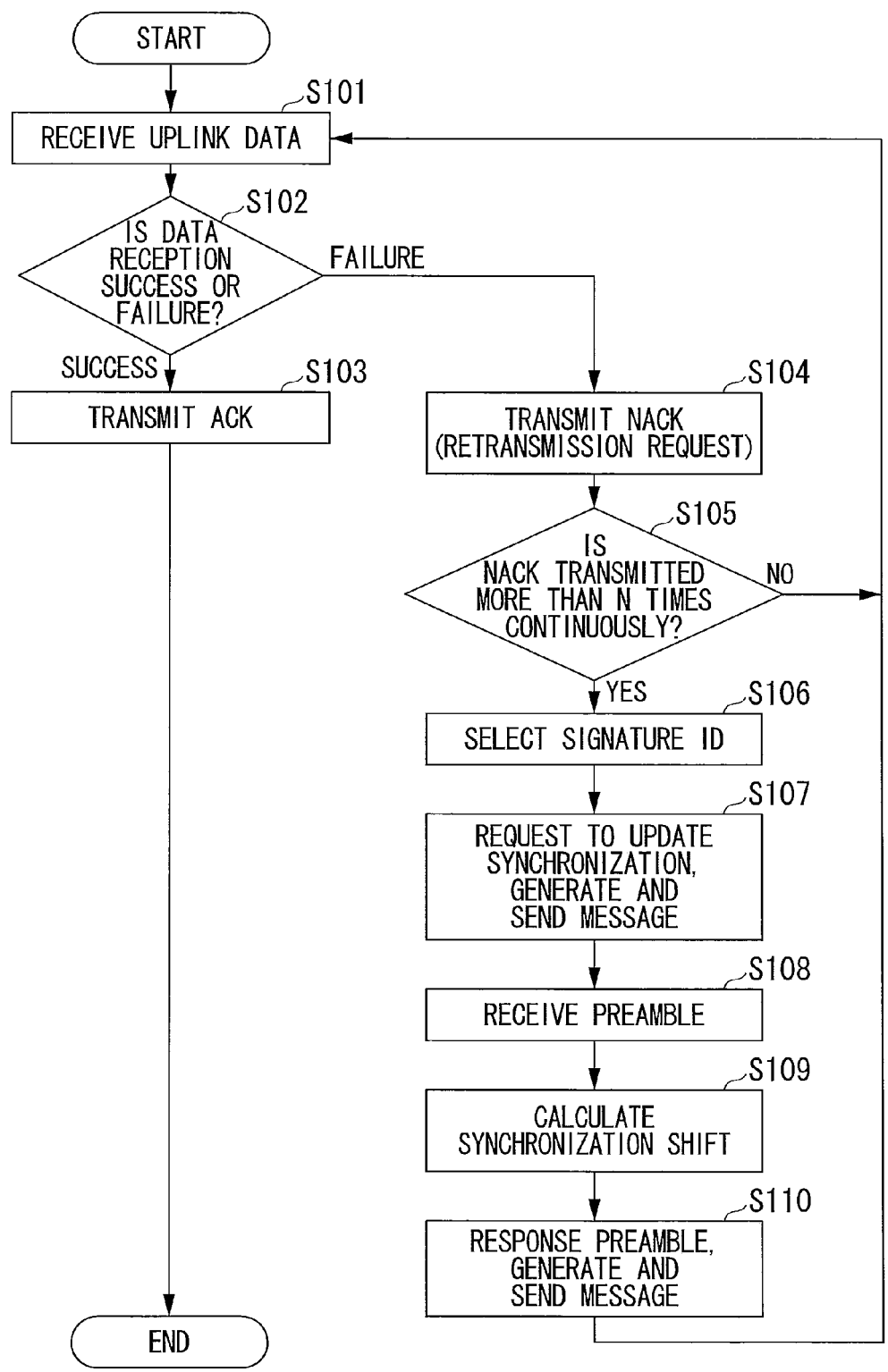
FIG. 5 is a flowchart showing processes of the base station device of the communication system according to the first embodiment of the present invention.

FIG. 5 is a flowchart showing aforementioned processes of the base station device 101a. The uplink data is received (step S101), and it is determined whether the received data is right or wrong (step S102). If the data is right, the acknowledgement ACK is transmitted to the mobile station device 102a (step S103).

If the data is wrong, the negative acknowledgement is transmitted (step S104). The number of times the negative acknowledgement NACK is continuously received is counted, and it is determined whether or not the number of times the negative acknowledgement NACK is received is over n times (step S105). If the number is less than n times, the data reception of the uplink is performed.

If the number of continuously receiving of the negative acknowledgement is over n times, the base station device 101a selects a signature ID (step S106), and generates a synchronization update request message which includes the signature ID and the C-RNTI, and sends it to the mobile station device 102a (step S107). The base station device 101a waits the preamble from the mobile station device 102a, and if the base station device 101a receives the preamble (step S108), the synchronization timing shift is calculated (step S109), and the preamble response message which includes the C-RNTI and the synchronization timing shift information is transmitted to the mobile station device 102a (step S110). Then, the reception of the uplink is performed (step S101).

Second Embodiment

Figure 6:
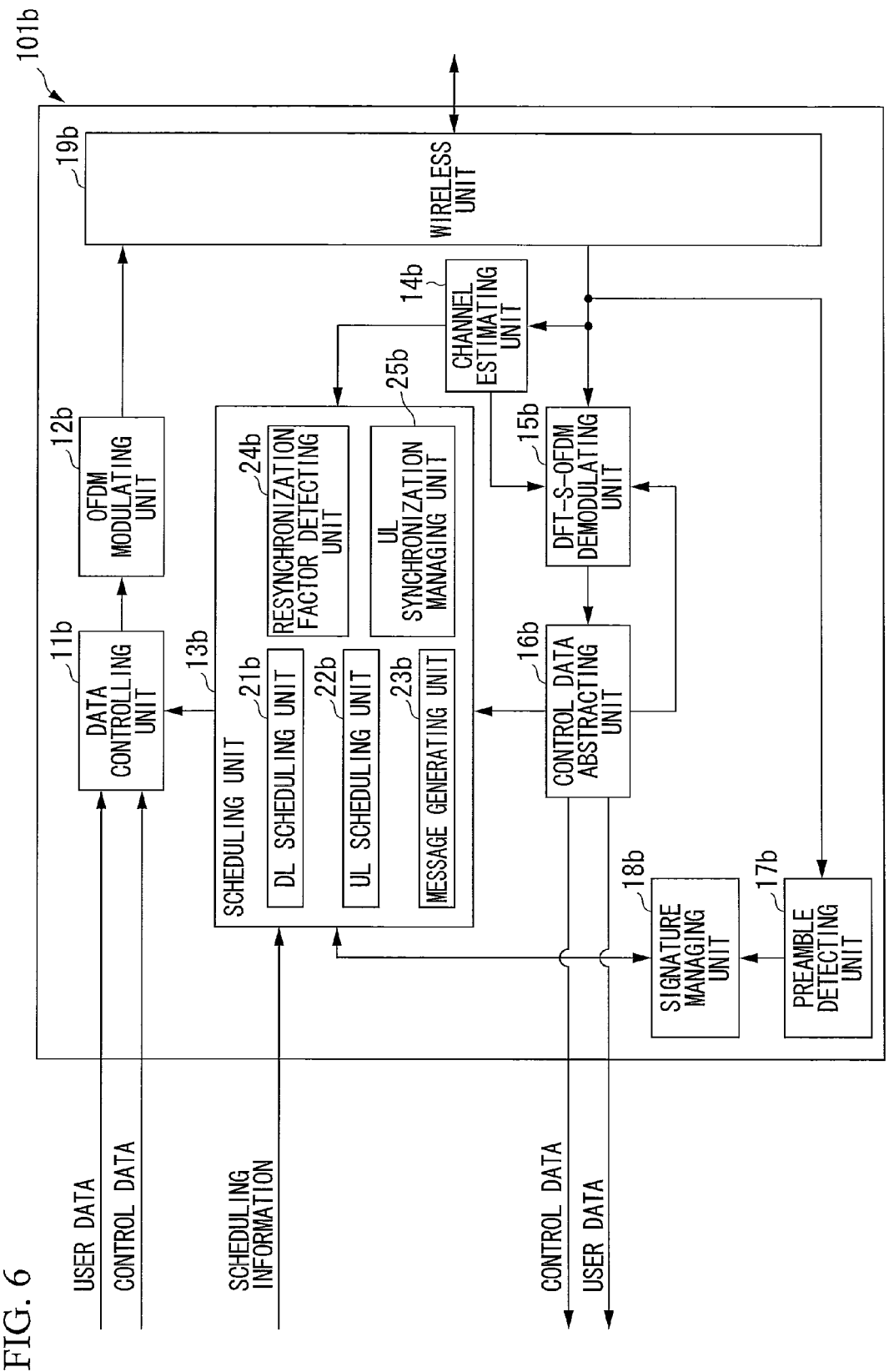
FIG. 6 is a block diagram showing a configuration of a base station device of a communication system according to a second embodiment of the present invention.

Next, second embodiment of the present invention is described. FIG. 6 is a block diagram showing a configuration of a base station device 101b of a communication system according to the second embodiment of the present invention.

As shown in FIG. 6, the base station device 101b of the communication system according to the second embodiment includes a data controlling unit 11b, an OFDM modulating unit 12b, a scheduling unit 13b, a channel estimating unit 14b, a DFT-S-OFDM demodulating unit 15b, a control data abstracting unit 16b, a preamble detecting unit 17b, a signature managing unit 18b and a wireless unit 19b. The scheduling unit 13b includes a DL scheduling unit 21b, a UL scheduling unit 22b, a message generating unit 23b, a resynchronization factor detecting unit 24b, and a UL synchronization managing unit 25b.

The configurations of the data controlling unit 11b, the OFDM modulating unit 12b, the DL scheduling unit 21b, the UL scheduling unit 22b and the message generating unit 23b of the scheduling unit 13b, the channel estimating unit 14b, the DFT-S-OFDM demodulating unit 15b, the control data abstracting unit 16b, the preamble detecting unit 17b, the signature managing unit 18b, and the wireless unit 19b are the same as the first embodiment. The explanations thereof may be omitted.

The channel estimating unit 14b estimates wireless channel characteristics based on the reference signal for demodulating of the uplink pilot channel UPiCH, and supplies a wireless channel estimation result to the DFT-S-OFDM demodulating unit 15b. The wireless channel estimation result is supplied to the scheduling unit 13b for performing a scheduling of the uplink based on the reference signal which is used for measuring of the uplink pilot channel UPiCH. In addition, the uplink pilot channel UPiCH which is not able to estimate a wireless channel is reported to the scheduling unit 13b.

The scheduling unit 13b includes a DL scheduling unit 21b which performs a scheduling of the downlink, a UL scheduling unit 22b which performs a scheduling of the uplink, a message generating unit 23b, a resynchronization factor detecting unit 24b, and a UL synchronization managing unit 25b.

The DL scheduling unit 21b performs a scheduling for mapping the user data and the control data to each channel of the downlink based on the CQI information sent by the mobile station device, the data information of each users sent by the upper layer, and the control data generated by the message generating unit The UL scheduling unit 22b performs a scheduling for mapping the user data to each channel of the uplink based on the wireless channel estimation result of the uplink from the channel estimating unit 14b and on the resource assignment request from the mobile station device.

The message generating unit 23b generates the control data (for example, an ACK/NACK of the uplink data, a preamble response message, or a synchronization update request message).

If the resynchronization factor detecting unit 24b is not able to continuously detect the reference signal of the uplink pilot channel UPiCH based on the detection result from the channel estimating unit 14b, the resynchronization factor detecting unit 24b determines that the synchronization of the mobile station device is deviated from, and sends to the UL synchronization managing unit 25b that the synchronization is deviated from.

The resynchronization factor detecting unit 25b determines whether or not a predetermined condition is fulfilled based on the signal received by the wireless unit 19b. Specifically, the resynchronization factor detecting unit 25b uses the predetermined condition as whether or not the reference signal is detected from the signal transmitted by the mobile station.

In addition, the resynchronize factor detecting unit 25b counts the number of predetermined conditions not fulfilled based on aforementioned determined result. Specifically, the resynchronization factor detecting unit 25b counts the number of not detecting the reference signal from the signal transmitted by the mobile station device.

The UL synchronization managing unit 25b manages the uplink synchronization state of the mobile station device 102b. In addition, the UL synchronization managing unit instructs the signature managing unit 18b to assign a signature for performing a synchronization update process in the mobile station device 102b.

In addition, the configuration of the mobile station device is the same as the mobile station device according to the first embodiment. Therefore, the explanation thereof is omitted.

In the communication system according to the second embodiment, the scheduling unit 13b of the base station device 101b includes the resynchronization factor detecting unit 24b. The resynchronization factor detecting unit 24b determines whether or not the reference signal is detected continuously based on the detection result of the channel estimating unit 14b. If the reference signal is not detected, the resynchronization factor detecting unit 24b determines that the synchronization has been deviated from, and controls the mobile station device to perform the synchronization update process.

In other words, the mobile station device which does not performs a data transmission of the uplink but may perform a data transmission regularly transmits the reference signal which is used for measuring of the uplink pilot channel UPiCH for preparing the synchronization maintenance and the data scheduling. If the uplink synchronization is established, the reference signal which is used for measuring from the mobile station device is transmitted using a transmission electric power capable of being detected by the base station device 101b. Therefore, most of the reference signals are detected. However, in the synchronization deviation, if the reference signal which is used for measuring is repeatedly transmitted, the reference signal which is used for measuring is not detected, because the transmission timing is deviated from.

Therefore, if the base station device 101b does not detect the reference signal which is used for measuring n times continuously, the synchronization deviation state or the nearly synchronization deviation state is determined, and the base station device orders a (Non-contention-based) random access to the mobile station device. In addition, if a synchronization process is necessary, the synchronization deviation state or the nearly synchronization deviation state may be determined. In the base station device, the UL synchronization managing unit 25b determines whether or not the resynchronization process is necessary.

Figure 7:
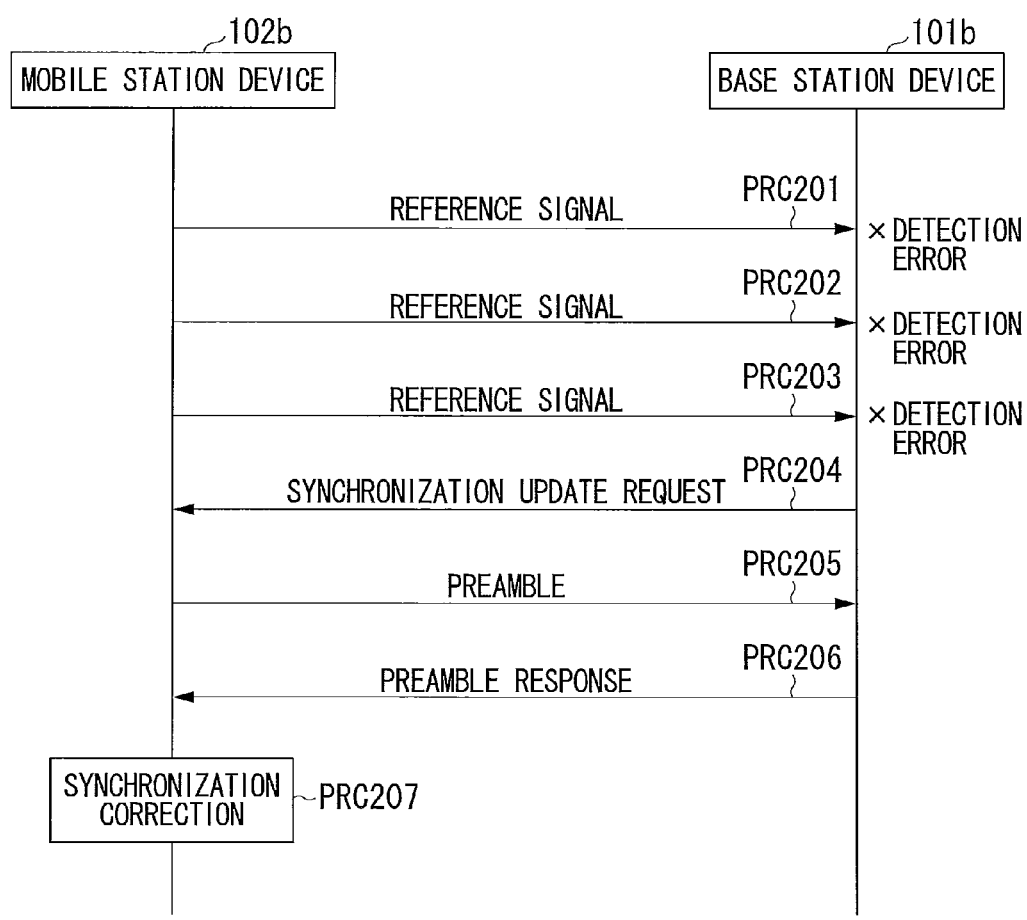
FIG. 7 is a sequence diagram showing communication processes of the communication system according to the second embodiment of the present invention.

The aforementioned control method is described below in detail with reference to FIG. 7. As shown in FIG. 7, the mobile station device transmits the reference signal which is used for measuring regularly using the uplink (processes PRC201 to PRC203). If the detection of the reference signal which is used for measuring transmitted by the mobile station device fails, the base station device counts the number of detection failures. In FIG. 7, in processes PRC201, PRC202 and PRC203, the reception of the reference signal which is used for measuring is failed, and a detection error occurs.

If the base station device 101*b* fails to detect the reference signal which is used for measuring from the mobile station device n times continuously, the base station device 101*b* selects a signature ID, and sends the synchronization update request message which includes the signature ID and the C-RNTI to the mobile station device using the downlink (process PRC204).

If the mobile station device receives the synchronization update request message, the mobile station device stops to transmit the reference signal which is used for measuring, and transmits the preamble for the uplink random access channel RACH using the signature which is included in the synchronization update request message (process PRC205). If the base station device 101*b* detects the preamble of the signature selected by the base station device 101*b*, the base station device calculates a synchronization timing shift, and transmits a preamble response message which includes the C-RNTI and the synchronization timing shift information to the mobile station device (process PRC206). If the mobile station device receives the preamble response, the mobile station device performs a synchronization correction based on the synchronization timing shift information (process PRC207). Then, the transmission of the reference signal which is used for measuring is resumed.

In addition, the synchronization update request message may include a time-frequency location information of using random access channel RACH.

Figure 8:
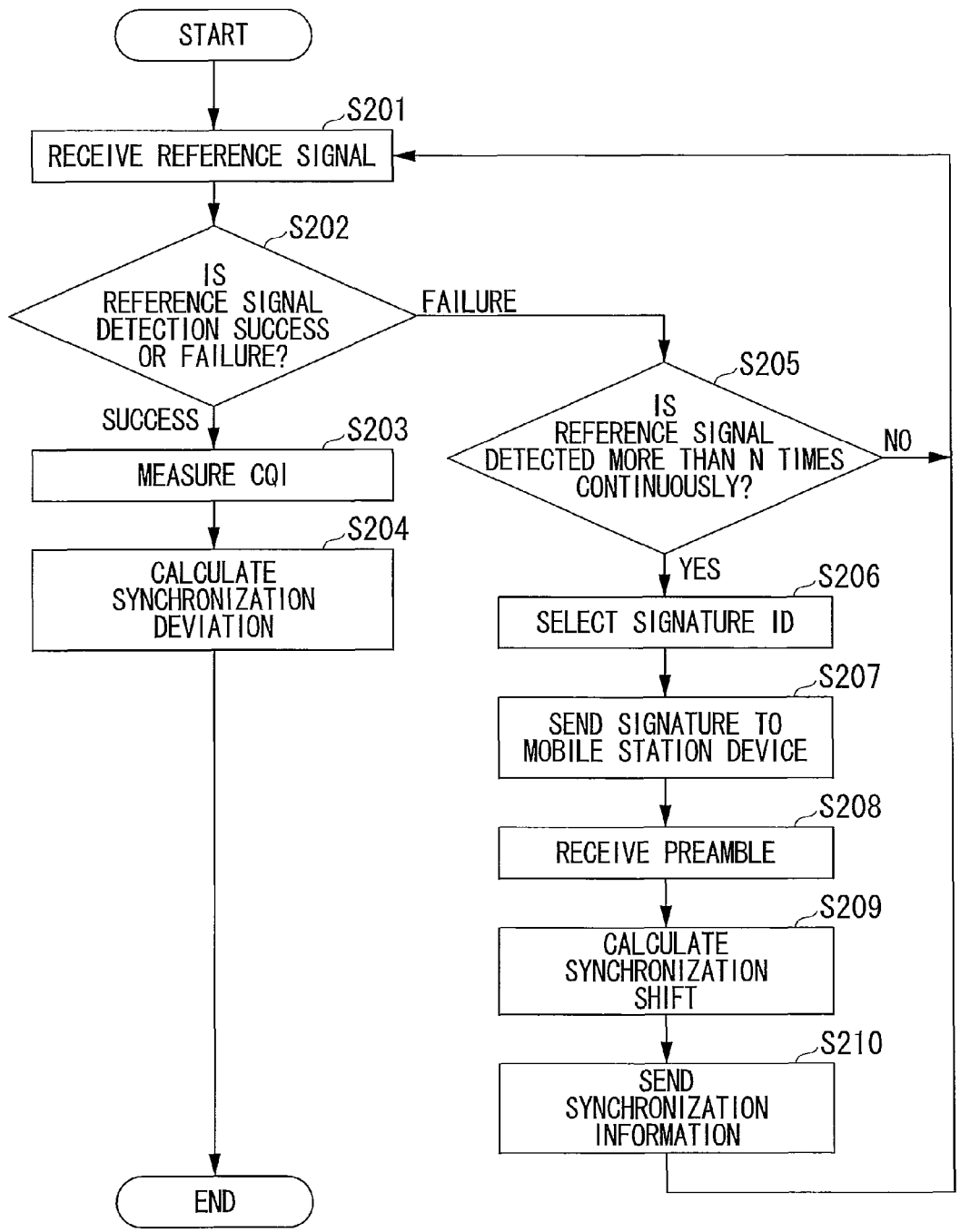
FIG. 8 is a flowchart showing processes of the base station device of the communication system according to the second embodiment of the present invention.

FIG. 8 is a flowchart showing the aforementioned processes of the base station device 101*b*. The uplink data is received, and the detection process of the reference signal which is used for measuring is performed (step S201). Then, it is determines whether or not the reference signal which is used for measuring is detected (step S202). If the reference signal which is used for measuring is detected, the uplink CQI is measured (step S203), and the synchronization timing shift is calculated (step S204).

If the reference signal which is used for measuring is not detected, the transmission number of continuously failing detection is counted, and determines whether or not the transmission number is over n times (step S205). If the transmission number is less than n times, the detection of the reference signal which is used for measuring is performed.

If the transmission number of continuously failing is over n times, a signature ID is selected (step S206), the synchronization update request message which includes the signature ID and the C-RNTI is generated and is transmitted to the mobile station device (step S207). Then, the mobile station device waits for the preamble transmitted by the mobile station device. If the mobile station device receives the preamble (step S208), the mobile station device detects the synchronization timing shift information from the preamble, and calculates the synchronization timing shift (step S209), and transits the preamble message which includes the C-RNTI and the synchronization timing shift information to the mobile station device (step S210). Next, the reception of the reference signal which is used for measuring is performed (step S201).

Third Embodiment

Figure 9:
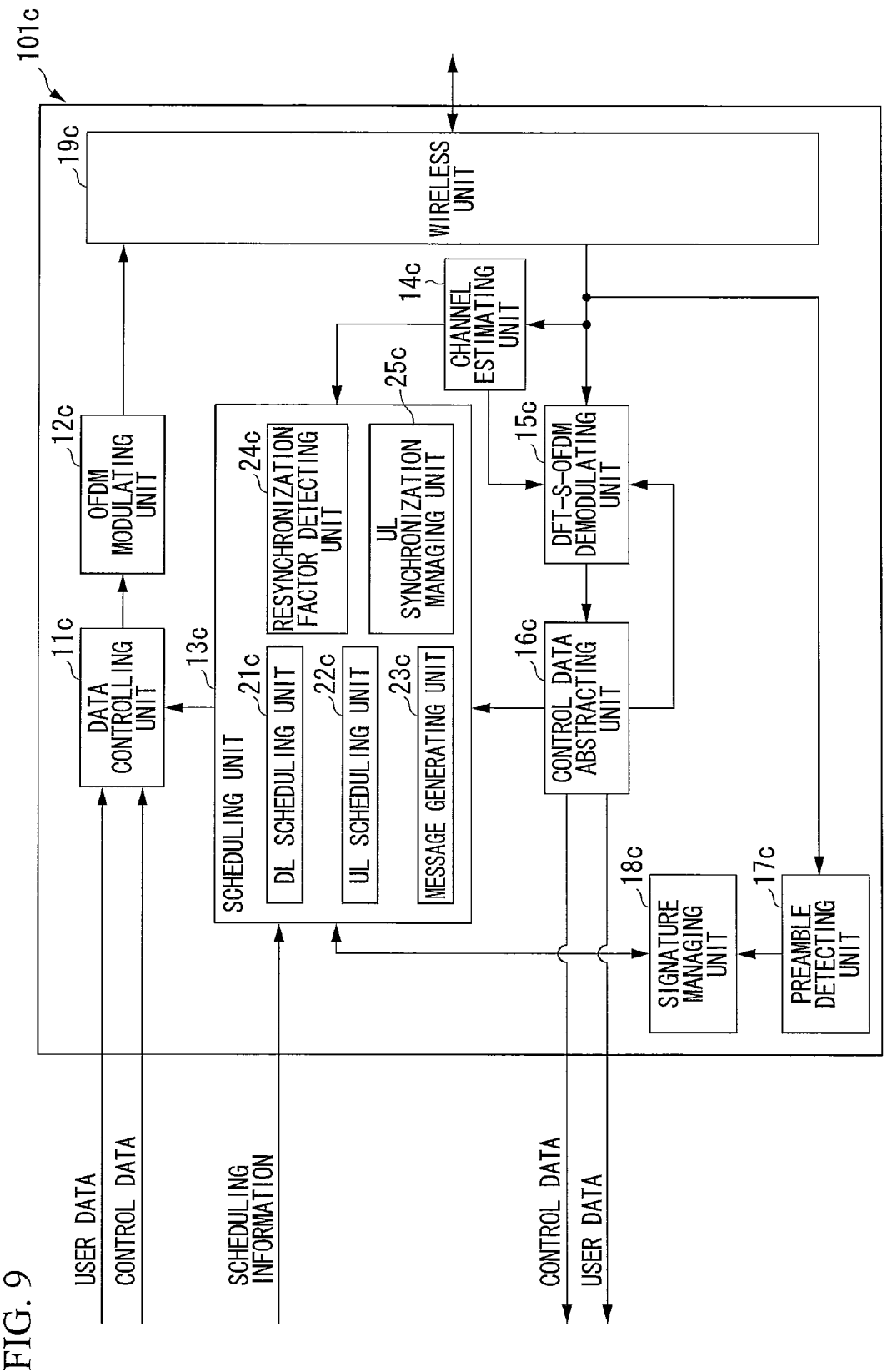
FIG. 9 is a block diagram showing a configuration of a base station device of a communication system according to a third embodiment of the present invention.

Next, a third embodiment of the present invention is described. FIG. 9 is a diagram showing a configuration of a base station device 101*c* of a communication system according to the third embodiment of the present invention.

As shown in FIG. 9, the base station device 101*c* of the communication system according to the third embodiment includes a data controlling unit 11*c*, an OFDM modulating unit 12*c*, a scheduling unit 13*c*, a channel estimating unit 14*c*, a DFT-S-OFDM demodulating unit 15*c*, a control data abstracting unit 16*c*, a preamble detecting unit 17*c*, a signature managing unit 18*c* and a wireless unit 19*c*. The scheduling unit 13*c* includes a DL scheduling unit 21*c*, a UL scheduling unit 22*c*, a message generating unit 23*c*, resynchronization factor detecting unit 24*c*, and a UL synchronization managing unit 25*c*.

The configurations of the data controlling unit 11*c*, the OFDM modulating unit 12*c*, the DL scheduling unit 21*c*, the UL scheduling unit 22*c* and the message generating unit 23*c* of the scheduling unit 13*c*, the channel estimating unit 14*c*, the DFT-S-OFDM demodulating unit 15*c*, the control data abstracting unit 16*c*, the preamble detecting unit 17*c*, the signature managing unit 18*c*, and wireless unit 19*c* are the same as in the first embodiment. Therefore, the explanations thereof are omitted.

The control data abstracting unit 16*c* checks whether the reception data is right or wrong, and sends the check result to the scheduling unit 13*c*. If the reception data is right, the reception data is separated into the user data and the control data. The control data of the layer 2 (for example, a downlink CQI information, an ACK/NACK of the downlink data) are supplied to the scheduling unit, and other data of the layer 3 (for example, a control data and a user data) are supplied to the upper layer. If the reception data is wrong, the reception data is stored to synthesize the retransmission data, and a synthesizing process is performed when the retransmission data is received. If the downlink CQI is not detected, the detection result is reported to the scheduling unit.

The scheduling unit 13*c* includes a DL scheduling unit 21*c* which performs downlink scheduling, a UL scheduling unit 22*c* which performs uplink scheduling, a message generating unit 23*c*, a resynchronization factor detecting unit 24*c*, and a UL synchronization managing unit 25*c*.

The DL scheduling unit 21*c* performs a scheduling of the user data and the control data to each downlink channels based on the CQI information sent by the mobile station device, the data information of each users sent by the upper layer and the control data generated by the message generating unit 23*c*.

The UL scheduling unit 22*c* performs a scheduling for mapping the user data to each uplink channel based on the uplink wireless channel estimation result from the channel estimating unit 14*c* and the resource assignment request from the mobile station device. The message generating unit 23*c* generates control data (for example, an ACK/NACK of the uplink data, a preamble response message, or a synchronization update request message).

If the resynchronization factor detecting unit 24*c* continuously fails to detect the downlink CQI from the control data abstracting unit 16*c* based on the detection result, the resynchronization factor detecting unit 24*c* determines that the synchronization has deviated, and sends the determination result to the UL synchronization managing unit 25*c*.

The resynchronization factor detecting unit 24*c* determines whether or not a predetermined condition is fulfilled based on the signal received by the wireless unit 19*c*. Specifically, the resynchronization factor detecting unit 24*c* uses whether or not the control signal is detected from the signal transmitted by the mobile station device as the predetermined condition.

In addition, the resynchronization factor detecting unit 24c counts the number of times that the predetermined condition was not fulfilled based on the aforementioned determination result. Specifically, the resynchronization factor detecting unit 24c counts the number that the control signal is not detected from the signal transmitted by the mobile station device. The UL synchronization managing unit 25c manages the uplink synchronization state of the mobile station device 102c. In addition, the UL synchronization managing unit 25c instructs the signature managing unit 18c to assign a signature so that the mobile station device 102c performs a synchronization update processing.

In addition, the constitution of the mobile station device is the same as in the first embodiment. Therefore the explanation thereof is omitted.

In the third embodiment of the present invention, the scheduling unit 13c of the base station device 101c includes the resynchronization factor detecting unit 24c. The resynchronization factor detecting unit 24c determines whether a downlink CQI is continuously detected based on the detection result of the downlink CQI from the control data abstracting unit 16c. If the downlink CQI is not continuously detected, the mobile station device performs a synchronization update process.

In other words, if the mobile station device does not receive the uplink data but receives the downlink data, the mobile station device transmits the downlink CQI for the downlink data scheduling using the uplink control channel PUCCH. In addition, the mobile station device transmits the ACK/NACK of the downlink reception data. If the uplink synchronization is established, the downlink CQI and the ACK/NACK are almost able to be detected. However, in the synchronization deviation state, the downlink CQI and the ACK/NACK are not able to be detected even if the retransmission is performed repeatedly because the transmission timing is deviated.

Therefore, if the base station device 101c does not detect the determination of the synchronization deviation n times continuously, the base station device 101c determines that the state is the synchronization deviation state or the nearly synchronization deviation state, and the base station device orders performs (Non-contention-based) random access to the mobile station device. In addition, the synchronization is necessary, and the synchronization deviation state or the nearly synchronization deviation state may be determined. In the base station device, the UL synchronization managing unit 25c determines whether or not the resynchronization processing is necessary.

Figure 10:
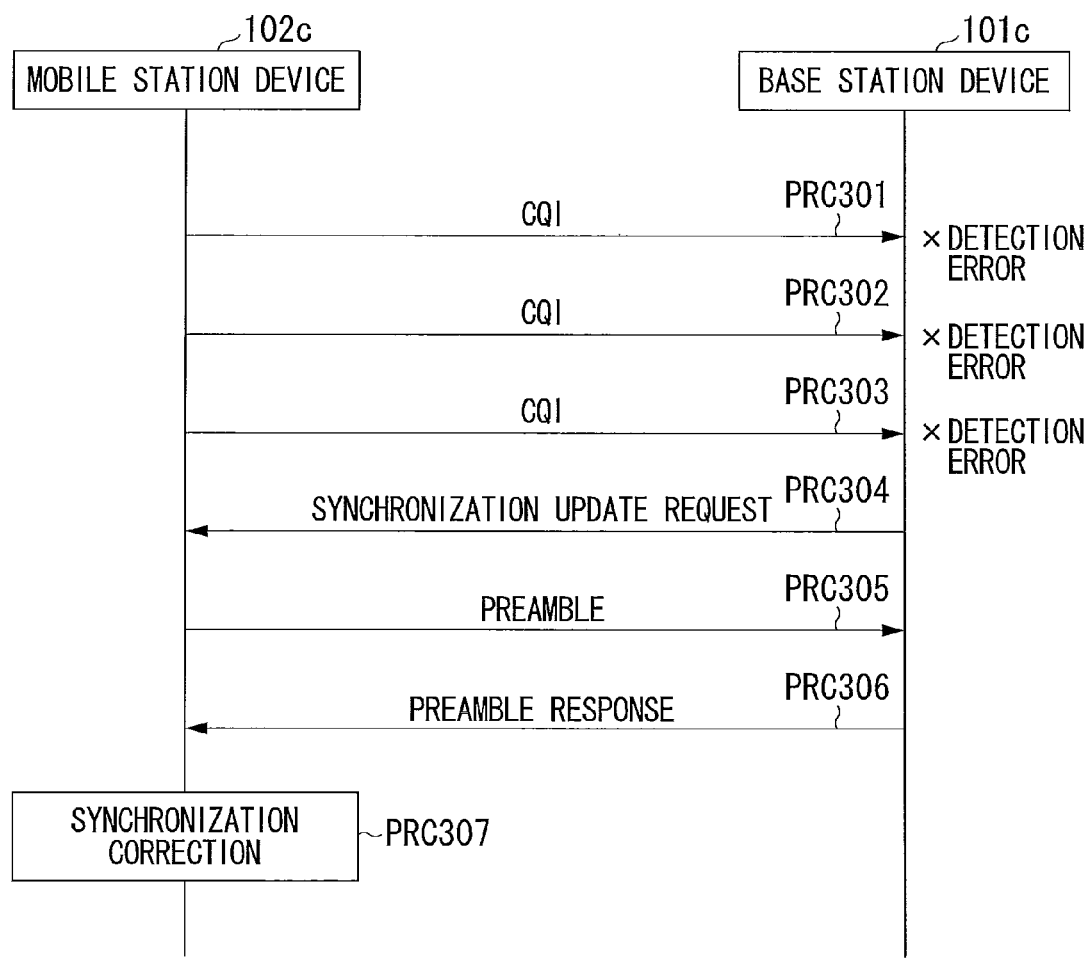
FIG. 10 is a sequence diagram showing communication processes of the communication system according to the third embodiment of the present invention.

The aforementioned control method is described below with reference to FIG. 10. As shown in FIG. 10, the mobile station device regularly transmits the downlink CQI to the base station device 101c (processes PRC301 to PRC303). If the base station device 101c fails to detect the downlink CQI transmitted by the mobile station device, the base station device counts the number of detection failure. In FIG. 10, in the processes PRC301, PRC302 and PRC 303, reception of the CQI fails, and detection errors occurs.

If the base station device 101c fails to detect the downlink CQI from the mobile station device n times continuously, the base station device 101c selects a signature and sends the synchronization update request message which includes the signature ID number and the C-RNTI to the mobile station device (process PRC304).

If the mobile station device receives the synchronization update request message, the mobile station device stops to transmit the downlink CQI, and the preamble for the random access channel RACH using the signature which is included in the synchronization update request message (process PRC 305). If the base station device 101c detects the preamble of signature selected by the base station device 101c, the base station device calculates the synchronization timing shift, and transmits the preamble response message which includes the C-RNTI and the synchronization timing shift information to the mobile station device (process PRC306). If the mobile station device receives the preamble response, the mobile station device performs the synchronization correction based on the synchronization timing shift information (process PRC307). Then, the transmission of the downlink CQI is resumed.

In addition, the synchronization update request message may include the time-frequency location of the using random access channel RACH.

Figure 11:
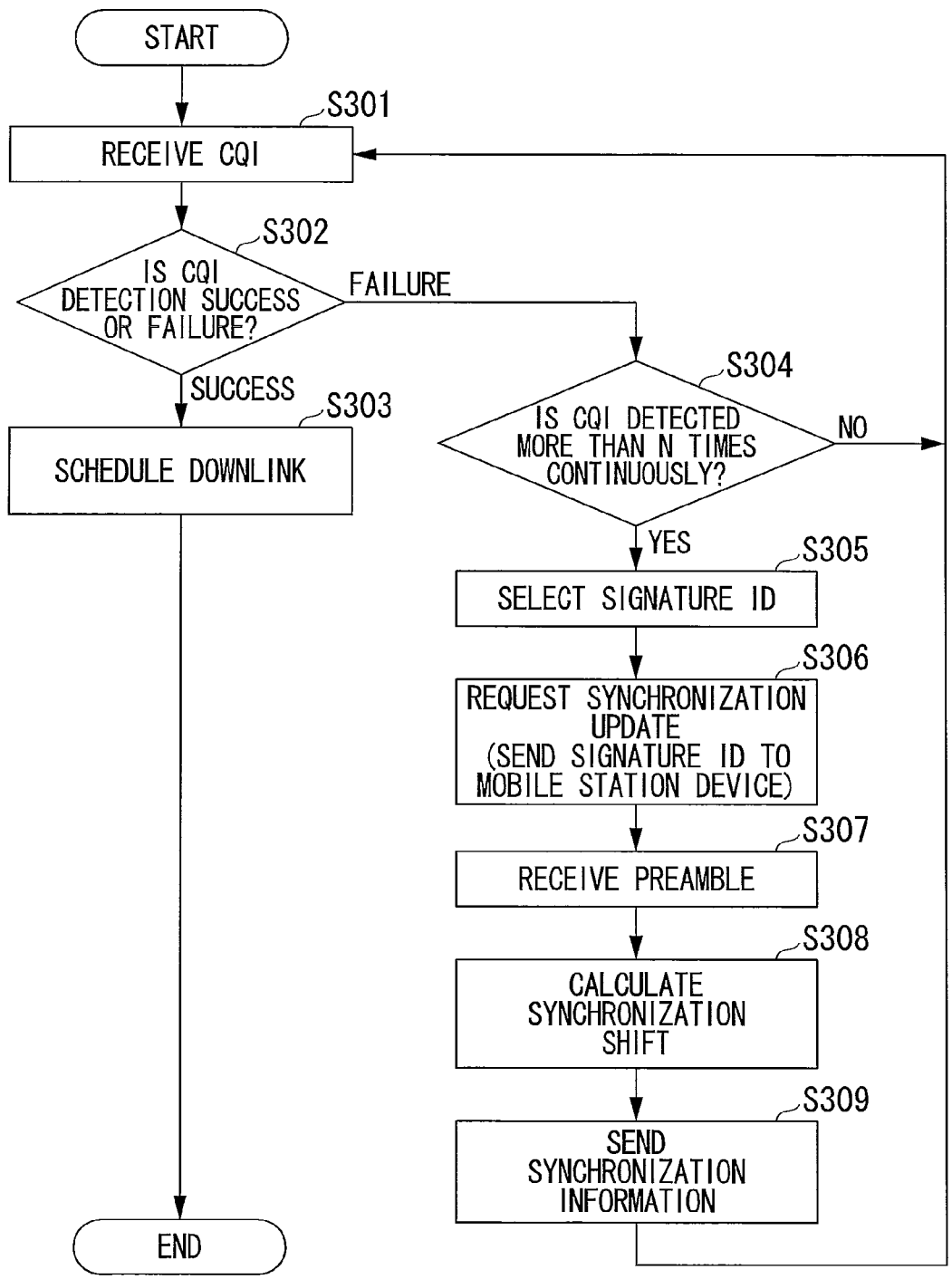
FIG. 11 is a flowchart showing processes of the base station device of the communication system according to the third embodiment of the present invention.

FIG. 11 is a flowchart showing the aforementioned processes of the base station device 101c. The base station device 101c receives a signal, and performs a detection process of the downlink CQI (step S301). Then, the base station device 101c determines whether or not the downlink CQI is detected (step S302). If the base station device 101c detects the CQI, the base station device performs a downlink scheduling (step S303).

If the base station device 101c does not detect the CQI, the base station device 101c counts the number of continuous transmission detection failures (step S304). If the number of continuous transmission detection failures is less than n, the detection of the downlink is performed again (step S301).

If the number of continuous transmission detection failures is equal or over n, the base station device 101c selects a signature ID (step S305), and generates the synchronization update request message which includes the signature ID and the C-RNTI, and sends it to the mobile station device (step S306). The base station device 101c waits the preamble from the mobile station device. If the base station device 101c receives the preamble (step S307), the base station device 101c calculates the synchronization timing shift information from the preamble, and calculates the synchronization timing shift (step S308). The base station device 101c transmits preamble response message which includes the synchronization timing shift and the C-RNTI to mobile station device (step S309). Next, the reception of the downlink is performed (step S301).

As described in the first to third embodiments, in spite of the synchronization maintenance state of the mobile station device, the base station device detects a synchronization deviation of the mobile station device, and the base station device transmits the synchronization recovery request signal. Therefore, in the mobile station device which is in the synchronization maintenance state, if the state changes to the synchronization deviation, it is possible to recover synchronization rapidly.

In addition, the mobile station device detects the synchronization deviation by the base station device and transmits the synchronization recovery request signal, and the synchronization state of the mobile station device changes to the non-synchronization state. By changing to the non-synchronization state, the synchronization timer is stopped (or reset), and it is possible to prohibit data transmission (include a control data) to the channel which except for the random access channel during the synchronization deviation state.

In addition, the base station device selects the signature, and the mobile station device performs a non-contention random access. Therefore, the synchronization recovery processing is finished early, and a synchronization is rapidly recovered.

Fourth Embodiment

Figure 12:
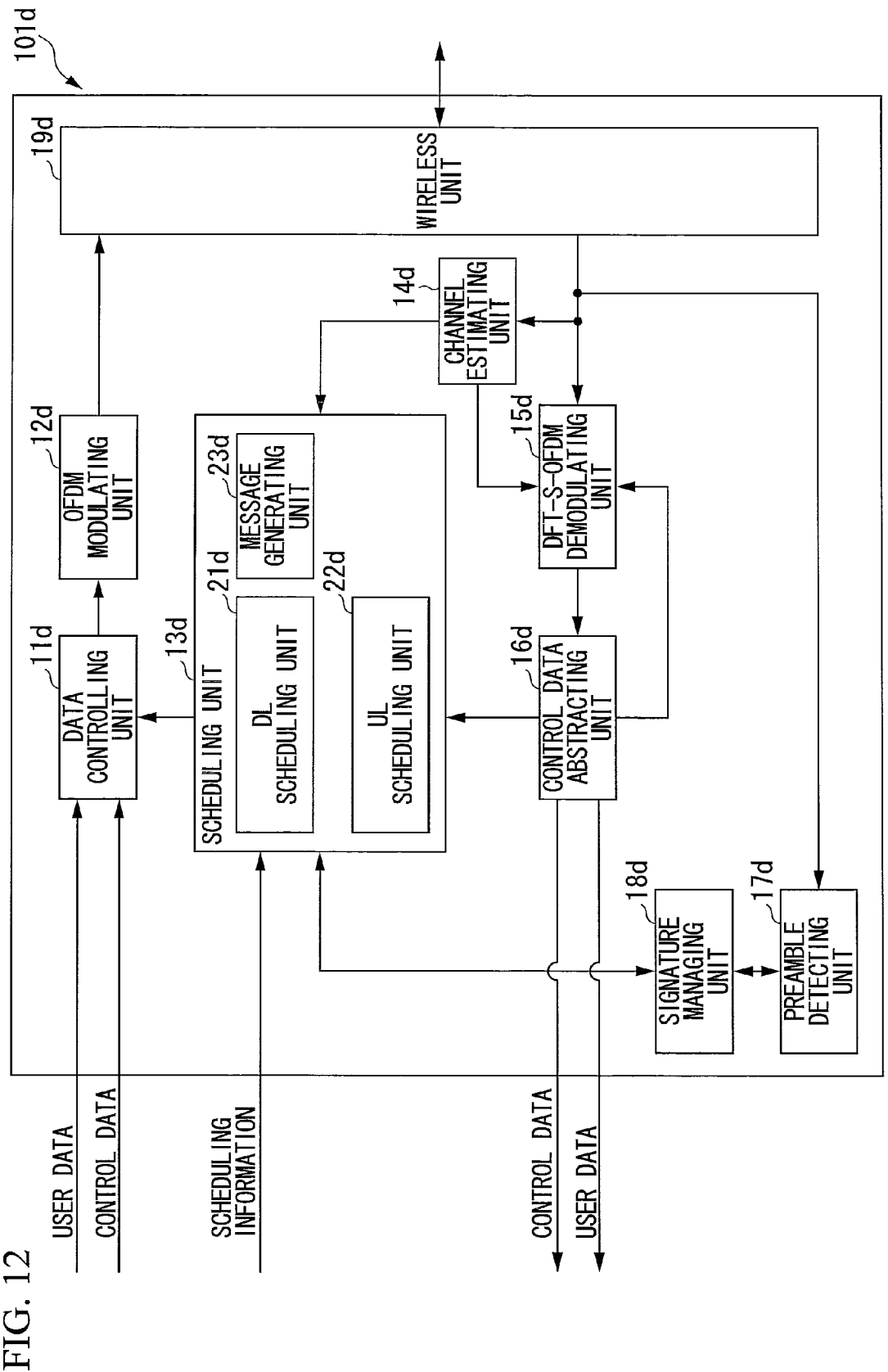
FIG. 12 is a block diagram showing a configuration of a base station device of a communication system according to a fourth embodiment of the present invention.

Next, a fourth embodiment of the present invention is described. FIG. 12 is a diagram showing a configuration of a base station device 101*d* of a communication system according to a fourth embodiment of the present invention.

As shown in FIG. 12, the base station device 101*d* of the communication device 101*d* according to the fourth embodiment includes a data controlling unit 11*d*, an OFDM modulating unit 12*d*, a scheduling unit 13*d*, a channel estimating unit 14*d*, a DFT-S-OFDM demodulating unit 15*d*, a control data abstracting unit 16*d*, a preamble detecting unit 17*d*, a signature managing unit 18*d* and a wireless unit 19*d*. The scheduling unit 13*d* includes a DL scheduling unit 21*d*, a UL scheduling unit 22*d* and a message generating unit 23*d*. These configurations are same as in the first embodiment. Therefore, explanations are omitted as much as possible.

In the base station device 101*d*, there is the synchronization state and the non-synchronization state, and the scheduling unit 13*d* manages the synchronization state and the non-synchronization state. If the base station device transmits the preamble response, the state is changed from the non-synchronization state to the synchronization state. Then, the base station device 101*d* and the mobile station device 102*d* communicate with each other. Before the synchronization timer is lapsed, the base station device 101*d* transmits the synchronization information to the mobile station device 102*d*, and the synchronization is maintained. If the base station device 101*d* becomes not to receive the uplink data (include a control data) from the mobile station device 102*d*, the state is changed to the non-synchronization state after the predetermined amount of time lapsed.

Figure 13:
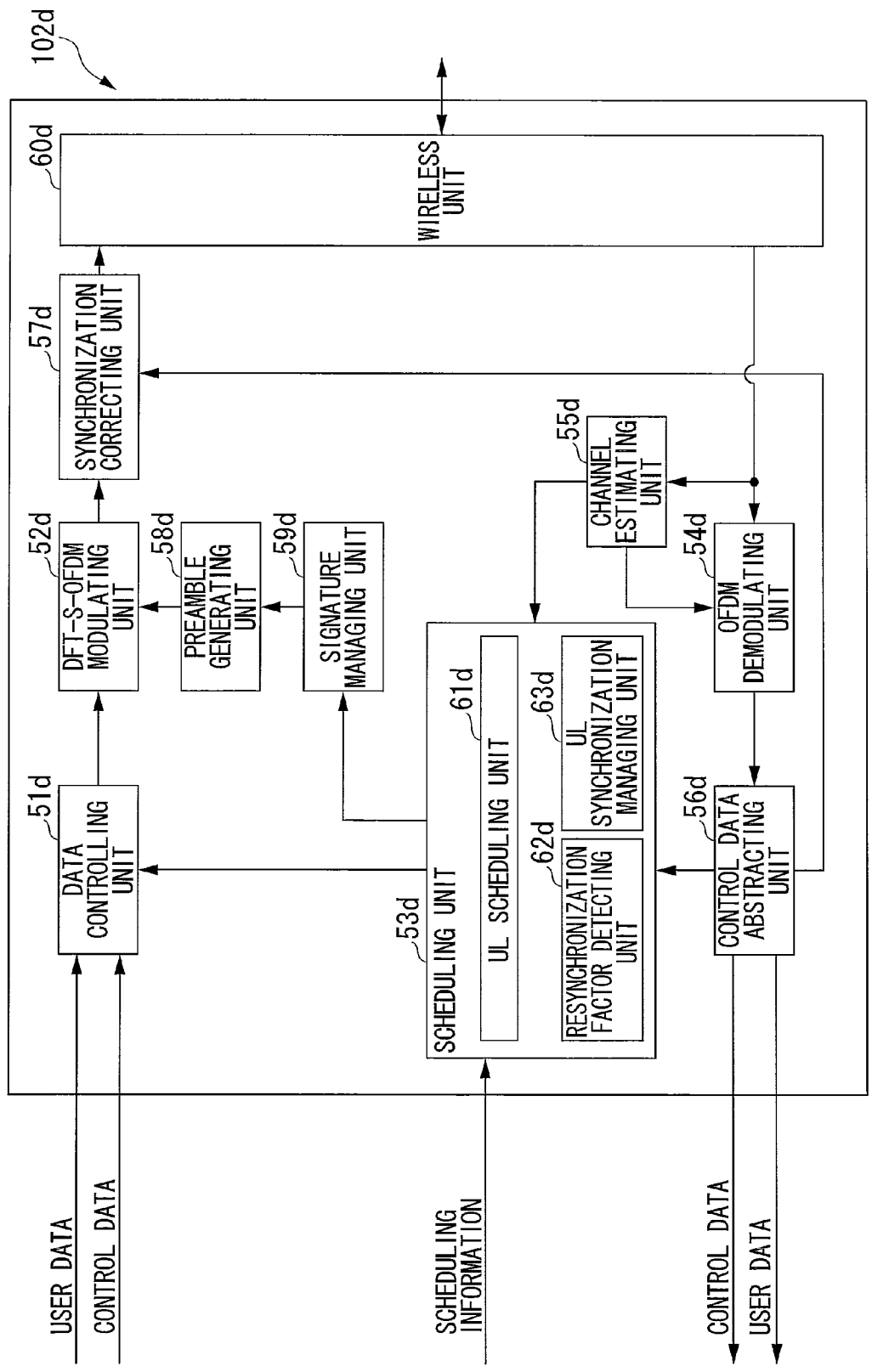
FIG. 13 is a block diagram showing a configuration of a mobile station device of the communication system according to the fourth embodiment of the present invention.

FIG. 13 is a diagram showing a configuration of a mobile station device 102*d* of the communication system according to the fourth embodiment of the present invention. As shown in FIG. 13, the mobile station device 102*d* of the communication system according to a fourth embodiment includes a data control unit 51*d*, a DFT-S-OFDM modulating unit 52*d*, a scheduling unit 53*d*, an OFDM demodulating unit 54*d*, a channel estimating unit 55*d*, a control data abstracting unit 56*d*, a synchronization correcting unit 57*d*, a preamble generating unit 58*d*, a signature selecting unit 59*d*, and a wireless unit 60*d* (also called a signal receiving unit and a transmitting unit). The scheduling unit 53*d* includes a UL scheduling unit 61*d*, a resynchronization factor detecting unit 62*d*, and a UL synchronization managing unit 63*d* (also called an uplink synchronization managing unit).

The user data and the control data are inputted to the data control unit 51*d*. The downlink CQI and the ACK/NACK are assigned to the uplink control channel PUCCH, and the user data and other signals which is except for the downlink CQI and the ACK/NACK are assigned to the uplink common channel PUSCH. In addition, the reference signal which is used for measuring and the reference signal for demodulating are assigned to the uplink pilot channel UPiCH.

The DFT-S-OFDM modulating unit 52*d* performs a DFT-S-OFDM signal processing (for example, a data modulation, a DFT conversion, a sub-carrier mapping, IFFT conversion, CP (Cyclic Prefix) insertion and filtering), and a DFT-Spread-OFDM signal is generated. Here, the communication system of the uplink uses a single carrier system (for example, the DFT-spread OFDM). However, the communication system of the uplink may use a multi carrier system (for example, the OFDM system).

The synchronization correcting unit 57*d* corrects a transmission timing based on the synchronization information outputted from the control data abstracting unit 56*d*, and demodulated data which is suitable for the transmission timing is supplied to the wireless unit 60*d*. The wireless unit 60*d* sets the wireless frequency instructed by the wireless controlling unit, and up-converts the modulated data to wireless frequency, and transmits the signal to the base station device 101*d* via antenna (not shown). If the number counted by the resynchronization factor detecting unit 62*d* is over the predetermined number, the wireless unit 60*d* transmits the synchronization signal to the base station device 101*d*.

In addition, the wireless unit 60*d* receives the signal transmitted by the base station device. Specifically, the wireless unit 60*d* receives the downlink data transmitted by the base station device 101*d*, down-converts the signal to base band signal, and supplies the reception signal to the OFDM demodulating unit 54*d*.

The channel estimating unit 55*d* estimates the wireless channel characteristics from the downlink pilot channel DPiCH, and supplies the estimation result to the OFDM demodulating unit 54*d*. In addition, The channel estimating unit 55*d* converts the signal to the CQI information to send the wireless channel estimation result to the base station device 101*d*, and supplies the CQI information to the scheduling unit 53*d*.

The OFDM demodulating unit 54*d* demodulates the reception data from the wireless channel estimation result of the channel estimating unit 55*d*.

The control data abstracting unit 56*d* separates the reception data into the user data and the control data. Among the control data, the synchronization information of the uplink is supplied to the synchronization correcting unit 57*d*, the scheduling information and other layer 2 control data are supplied to the scheduling unit 53*d*, and the layer 3 control data and the user data are supplied to the upper layer. If the negative acknowledgement is received, it is sent to the scheduling unit 53*d*.

The scheduling unit 53*d* includes a UL scheduling unit 61*d* which performs an uplink scheduling, a resynchronization factor detecting unit 62*d* and a UL synchronization managing unit 63*d*.

The uplink scheduling unit 61*d* performs a mapping of user data and the control data which are transmitted by the uplink into each channels based on the control information outputted from the control data abstracting unit 56*d* and the scheduling information outputted from the upper layer. In addition, the uplink scheduling unit 61*d* instructs the signature selecting unit 59*d* to perform a random access based on the instruction information from the upper layer.

The resynchronization factor detecting unit 62*d* counts the detection result of the negative acknowledge NACK of the control data abstracting unit 56*d*. If the negative acknowledge NACK is continuously received n times, the resynchronization factor detecting unit 62*d* determines that the synchronization of the mobile station device 102*d* is deviated, and sends it to the UL synchronization managing unit 63*d*.

In other words, the resynchronization factor detecting unit 62*d* determines whether or not the signal received by the wireless unit 60*d* is the retransmission request. Specifically, the resynchronization factor detecting unit 62*d* uses whether or not the signal transmitted by the base station device 101*d* is the signal which indicates receiving is impossible.

In addition, the resynchronization factor detecting unit 62*d* counts the number of times the signal received by the wireless unit 60*d* is determined as the retransmission request. Specifically, the resynchronization factor detecting unit 62*d* counts the number of the signal transmitted by the base station device 101*d* which indicates that the receiving is impossible. The UL synchronization managing unit 63*d* manages the uplink synchronization state of the mobile station device 102*d*. In addition, to perform the synchronization update processing by the mobile station device, the UL synchronization managing unit 63d instructs the signature selecting unit 59d to perform a random access to the signature managing unit 18d.

Figure 14:
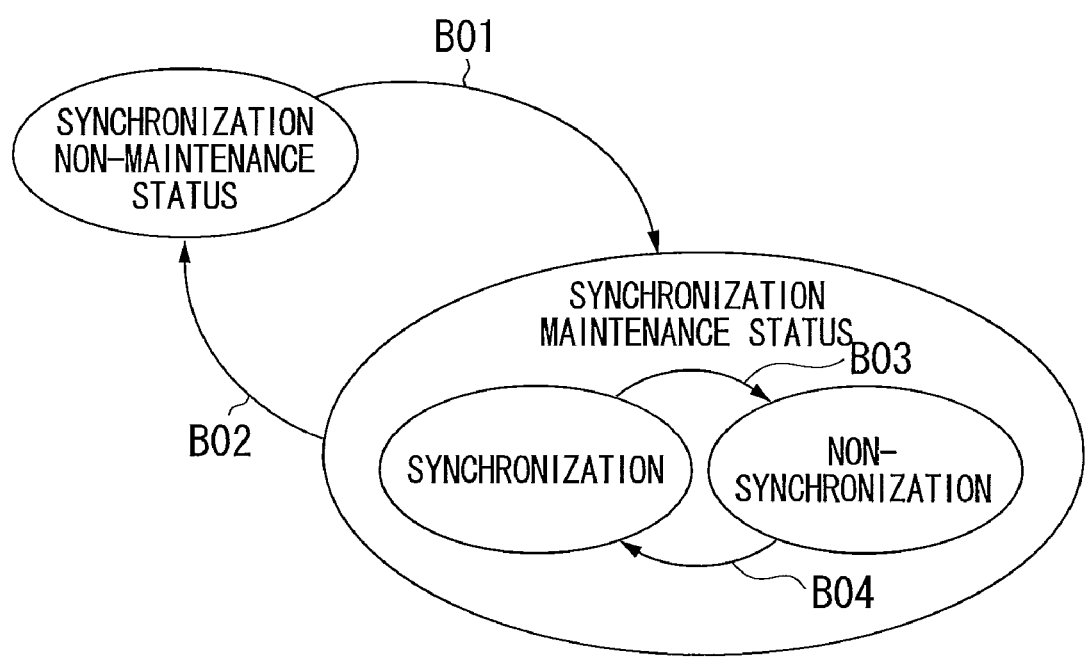
FIG. 14 is a state diagram of a UL synchronization managing unit 63d according to the fourth embodiment of the present invention.

FIG. 14 is a state diagram of a UL synchronization managing unit 63d according to the fourth embodiment of the present invention. The mobile station device 102d performs a random access to the base station device 101d. If the mobile station device 102d receives the random access response from the base station device 101d (step B01), a state is changed to the synchronization state.

If the communication between the base station device 101d and the mobile station device 102d is finished and the predetermined amount of time has lapsed (the synchronization timer is expired) (step B02), and the state is changed to the synchronization non-maintenance state. In the synchronization maintenance state, there is the synchronization state and the non-synchronization state. When it is changed from the step B01, the synchronization state of the synchronization maintenance state is set.

During the synchronization state of the synchronization maintenance state, the synchronization timing shift information is received from the base station device 101d before the synchronization timer elapsed, and the synchronization state is maintained. If the resynchronization factor detecting unit 62d determines that the state is the synchronization deviation from the detection result of the negative acknowledge NACK of the control data abstracting unit 56d (step B03), the state is changed to the non-synchronization state of the synchronization maintenance state.

If the state is changed to the non-synchronization state of the synchronization maintenance state, the instruction of performing the random access is supplied to the signature selecting unit 59d to perform the synchronization update processing. The mobile station device 102d selects the signature ID, and performs a random access using the preamble of the selected signature ID. Then, the base station device 101d detects the preamble, and transmits the preamble response to the mobile station device 102d. If the mobile station device 102d receives the preamble response and updates the synchronization from the synchronization timing shift information, the state is changed to the synchronization state of the synchronization maintenance state.

In addition, the synchronization maintenance state is the state that the base station device and the mobile station device are communicated with each other and the mobile station device receives the downlink data (include a control data) and transmits the uplink data (include a control data), or is a state before the synchronization timer expires.

The signature selecting unit 59d selects the signature ID number which uses the random access based on the instruction from the scheduling unit 53d, and supplies the selected signature ID number to the preamble generating unit 58d. If the signature ID number is supplied from the scheduling unit 53d, the instructed signature ID number is supplied to the preamble generating unit 58d.

The preamble generating unit 58d generates the preamble based on the signature ID number selected by the signature selecting unit 59d, and supplies it to the DFT-S-OFDM modulating unit 52d.

In the first to third embodiments, the base station device 101d detects the synchronization deviation. However, in the fourth embodiment, the mobile station device detects the synchronization deviation.

If the uplink synchronization is established, the data transmission from the mobile station device 102 fails because of rapidly changing wireless channels. However, if the retransmission process is repeated a few times, the data transmission succeed, because a high speed hybrid automatic repeat request is used. However, in the state of the synchronization deviation, if the retransmission is repeated, the data transmission does not succeed because the transmission timing is deviated from.

Therefore, data transmitted by the mobile station device for the response of the synchronization deviation determination from the base station device 101d is received n times continuously, it is determined that the state is the uplink synchronization deviation state or the nearly synchronization deviation state, and the mobile station device performs a (contention-based) random access. In addition, if the synchronization process is necessary, the synchronization deviation state or the nearly synchronization deviation state may be determined. The mobile station device determines whether or not the resynchronization process is necessary by the UL synchronization managing unit 62d.

Figure 15:
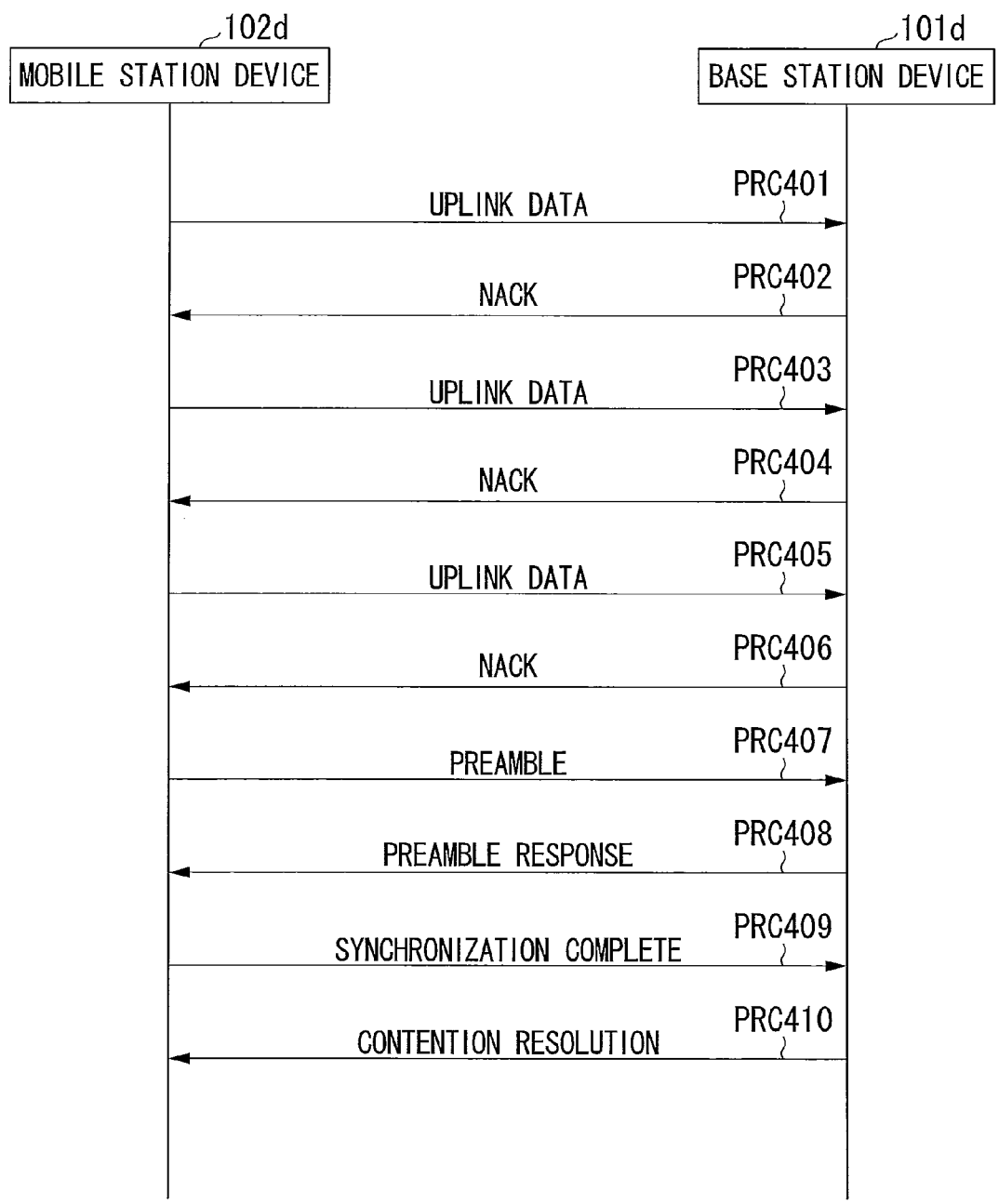
FIG. 15 is a sequence diagram showing communication processes of the communication system according to the fourth embodiment of the present invention.

The aforementioned control method is described below with reference to FIG. 15. As shown in FIG. 15, the mobile station device 102d transmits the data to the base station device 101d using the uplink (process PRC401). If the reception of the data transmitted by the mobile station device 102 fails, the base station device 101d transmits the negative acknowledgement NACK to the mobile station device 102d using the downlink (process PRC402).

If the mobile station device 102d receives the negative acknowledge NACK, the mobile station device 102d transmits the retransmission data to the base station device 101d (process PRC403). Then if the reception of data transmitted by the mobile station device 102d fails again, the base station device 101d transmits the transmitted data to the mobile station device 102d again (process PRC404). Then, the mobile station device 102d transmits the retransmission data to the base station device 101d (process PRC405). If the reception of data transmitted by the mobile station device 102d fails again, the mobile station device 102d transmits the negative acknowledge NACK to the mobile station device 102d again (process PRC406).

If the mobile station device 102d receives the negative acknowledgement NACK, the mobile station device 102d counts the negative acknowledgement NACK. If the mobile station device 102d receives the negative acknowledge NACK of the data transmitted by the mobile station device 102d n times continuously, the mobile station device stops the transmission of the retransmission data. Then the mobile station device 102d selects the signature, and transmits the preamble to the random access channel RACH of the uplink (process PRC407).

If the preamble is detected, the base station device 101d calculates the synchronization timing shift, and performs a scheduling for transmitting the L2/L3 message by the mobile station device 102d. Then, the base station device 101 transmits the preamble response message which includes the RA-RNTI, the synchronization timing shift information, and the scheduling information of the L2/L3 message (process PRC408).

If the mobile station device 102d receives the preamble response, the mobile station device 102d performs a synchronization correction based on the synchronization timing shift information, and transmits the L2/L3 message which represents the synchronization is updated (process PRC409).

If the L2/L3 message is received, the base station device 101d transmits the contention resolution to the mobile station device 102d (process PRC410). If the mobile station device 102d receives the contention resolution, the data transmission and the data reception between the base station device and the mobile station device are resumed.

Figure 16:
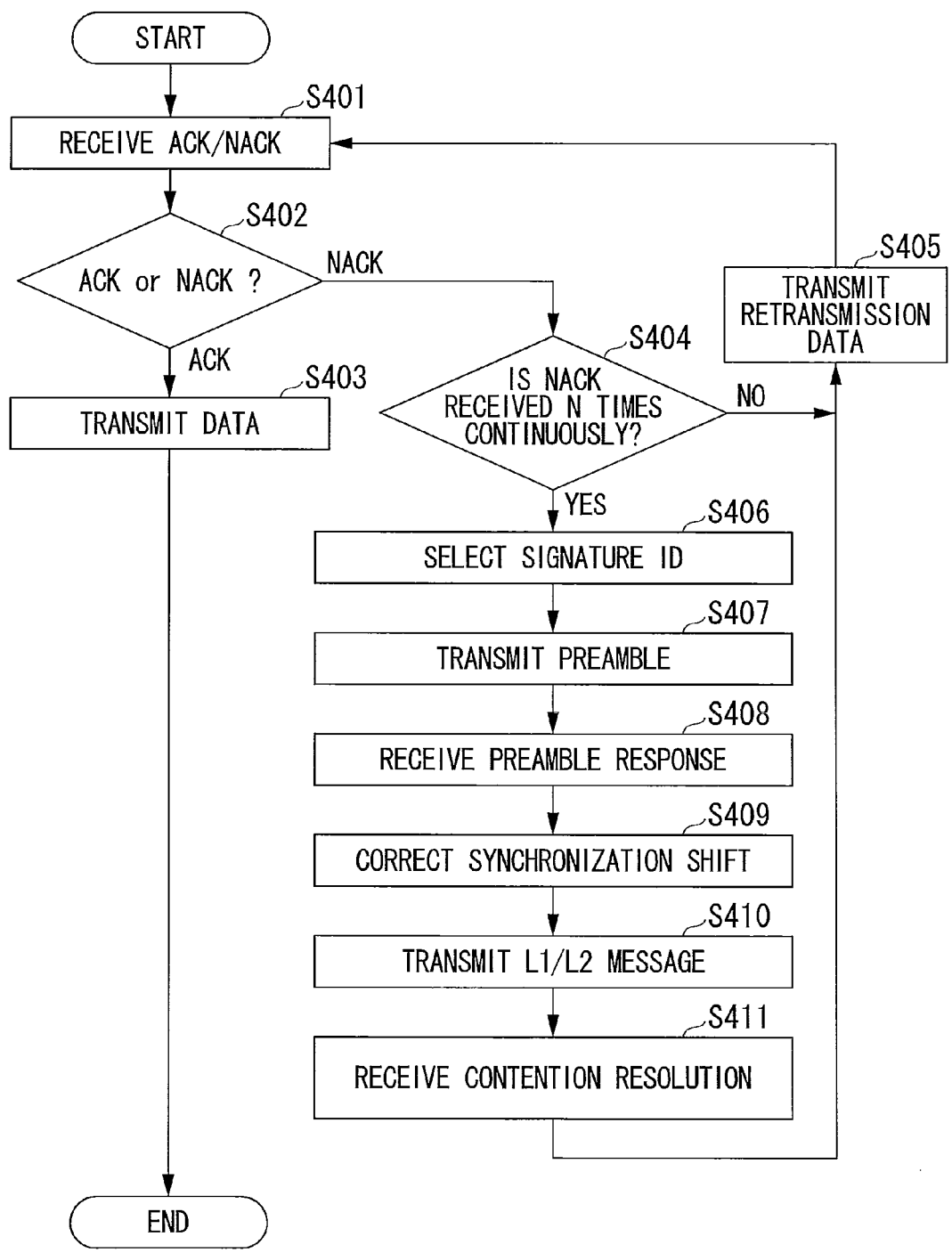
FIG. 16 is a flowchart showing processes of the base station device of the communication system according to the fourth embodiment of the present invention.

FIG. 16 is a flowchart showing the aforementioned processes of the mobile station device 102d. The response of the transmission data of the uplink is received (step S401). It is determined whether or not the response from the base station device 101d is the acknowledgement ACK or the negative acknowledgement NACK (step S402). If the response is the acknowledgement ACK, new data is transmitted to the base station device 101d (step S403).

If the response is the negative acknowledgement NACK, the retransmission data is transmitted, and the number of continuously transmitting the negative acknowledgement is counted, and it is determined whether or not the continuously transmission number of the negative acknowledge is over n times (step S404). If the continuously transmission number of the negative acknowledgement NACK is less than n times, the retransmission data is transmitted (step S405). Then, the reception of the ACK/NACK is performed (step S401).

If the continuously transmission number of the negative acknowledgement NACK is over n times, a signature is selected (step S406), and the preamble is transmitted to the random access channel RACH (step S407). Then, the preamble response is waited. If the preamble response is received (step S408), the synchronization correction is performed using the synchronization timing shift information which is included in the preamble response (step S409), and the L2/L3 message which represents the synchronization being updated is generated, and the L2/L3 message is transmitted to the base station device 101d (step S410). Then, the reception of the contention resolution is waited, the contention resolution is received (step S411), and data transmission is resumed. Then, the retransmission data is transmitted (step S405).

Fifth Embodiment

Figure 17:
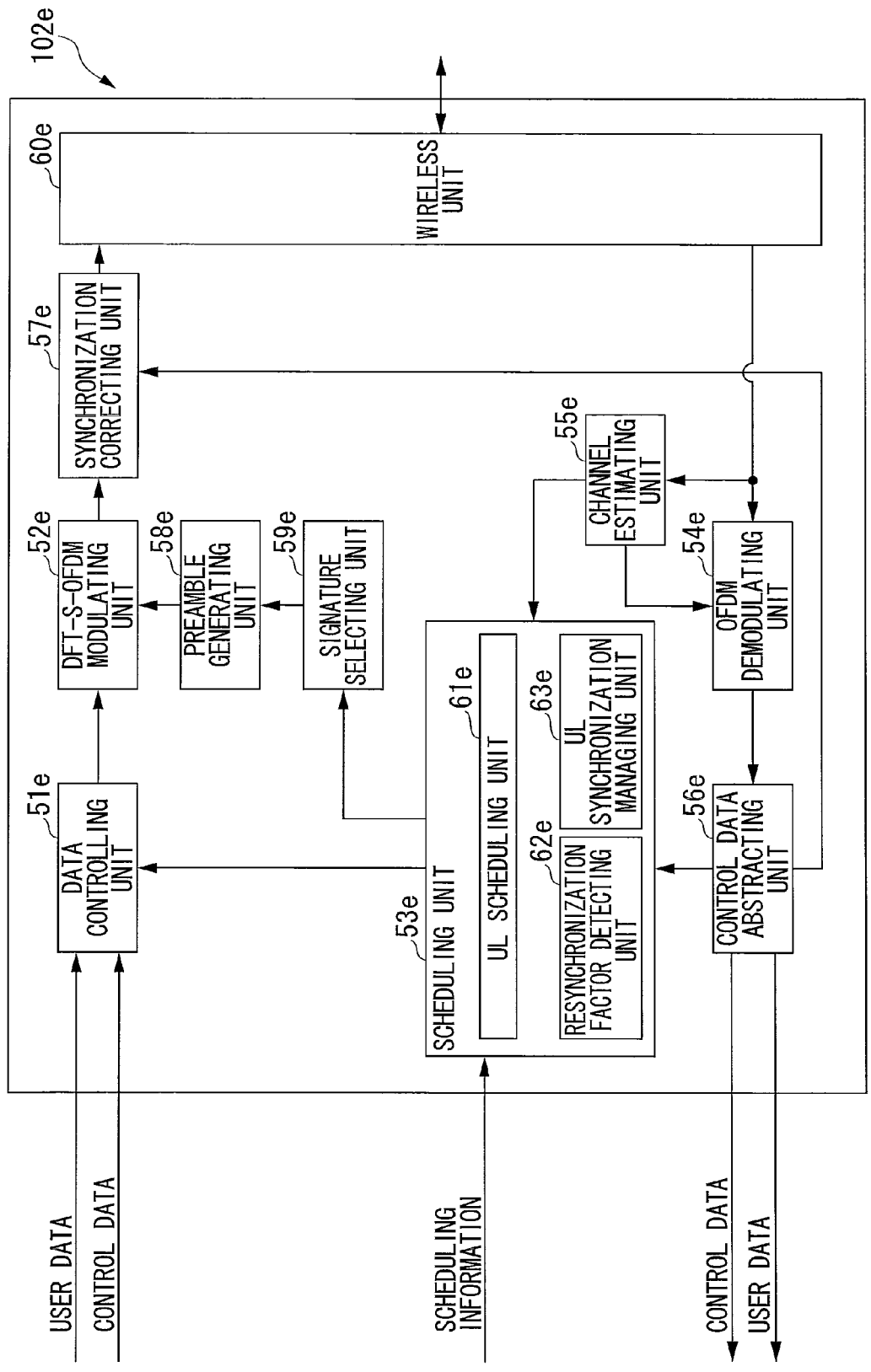
FIG. 17 is a block diagram showing a configuration of a mobile station device of the communication system according to a fifth embodiment of the present invention.

Next, a fifth embodiment of the present invention is described. FIG. 17 is a diagram showing a configuration of a mobile station device 102e of the communication system according to the fifth embodiment of the present invention.

As shown in FIG. 17, the mobile station device 102e according to the fifth embodiment includes a data controlling unit 51e, a DFT-S-OFDM modulating unit 52e, a scheduling unit 53e, an OFDM demodulating unit 54e, a channel estimating unit 55e, a control data abstracting unit 56e, a synchronization correcting unit 57e, a preamble generating unit 58e, a signature selecting unit 59e, and a wireless unit 60e (also called a signal receiving unit, a transmitting unit). The scheduling unit 53e includes an uplink scheduling unit 61e, a resynchronization factor detecting unit 62e, and a UL synchronization managing unit 63e.

The use data and the control data are supplied to the data controlling unit 51e. Based on the instructions from the scheduling unit 53e, the downlink CQI and the ACK/NACK are assigned to the uplink control channel PUCCH, and the user data and signals except for the downlink CQI and the ACK/NACK are assigned to the uplink common channel. In addition, the reference signal which is used for measuring and the reference signal for demodulating are assigned to the uplink pilot channel UPiCH.

The DFT-S-OFDM modulating unit 52e performs the DFT-S-OFDM signal processing (for example, a data modulation, and performs a DFT conversion, a sub-carrier mapping, an IFFT conversion, a CP (Cyclic Prefix) insertion and filtering) and a DFT-Spread-OFDM signal is generated. Here, the uplink communication system uses a single carrier system (for example, a DFT-spread OFDM). The uplink communication system may use a multi carrier system (for example, OFDM system):

The synchronization correcting unit 57e corrects the transmission timing based on the synchronization information supplied by the control data abstracting unit 56e, and supplies the data modulated to be suitable for the transmission timing to the wireless unit 60e.

The wireless unit 60e sets the signal to a wireless frequency instructed by the wireless controlling unit, and performs an up-convert of the demodulated data to wireless frequency, and transmits to the base station device 101e via antenna (not shown). If the number counted by the resynchronization factor detecting unit 62e is over the predetermined number, the wireless unit 60e transmits the synchronization signal to the base station device 101e.

In addition, the wireless unit 60e receives the signal transmitted by the base station device 101e. Specifically, the wireless unit 60e receives the downlink data from the base station device 101e, and performs a down-conversion to a base band signal, and supplies the reception signal to the OFDM demodulating unit 54e.

The channel estimating unit 55e estimates the wireless channel characteristics based on the downlink pilot channel DPiCH, and supplies the estimation result to the OFDM demodulating unit 54e. In addition, the channel estimating unit 55e converts the signal to the CQI information to send the wireless channel estimation result, and supplies the CQI information to the scheduling unit 53e.

The OFDM demodulating unit 54e demodulates the reception data from the wireless channel estimation result of the channel estimating unit 55e. The control data abstracting unit 56e separates the reception data into the user data and the control data. Among the control data, the synchronization information of the uplink is supplied to the synchronization correcting unit 57e, the scheduling information and signals except for the control data of the layer 2 are supplied to the scheduling unit 53e, and the control data of layer 3 and the user data are supplied to the upper layer. If the reception of the broadcast channel fails, it is reported to the scheduling unit 53e.

The scheduling unit 53e includes a UL scheduling unit 61e which performs a scheduling of the uplink, a resynchronization factor detecting unit 62e, and a UL synchronization managing unit 63e.

The UL scheduling unit 61e performs a mapping of the user data and control data which are transmitted in the uplink based on the control information supplied by the control data abstracting unit 56e and the scheduling information supplied by the upper layer. In addition, the UL scheduling unit 61e instructs the signature selecting unit 59e to perform a random access based on information instructed by the upper layer. The resynchronization factor detecting unit 62e counts the result of the control data abstracting unit 56e. If the reception of the broadcast channel fails n times continuously, the resynchronization factor detecting unit 62e determines that the synchronization of the mobile station device 102e deviates, and sends it to the UL synchronization managing unit 63e.

The resynchronization factor detecting unit 62e determines whether or not the signal received by the wireless unit 60e of the base station device 101e is a retransmission request. Specifically, the resynchronization factor detecting unit 62e determines whether or not the signal of broadcast channel is detected from the signal transmitted by the base station device 101e, as the predetermined condition.

In addition, the synchronization factor detecting unit 62e counts the number that the wireless unit 60e determines the received signal received by the wireless unit 60e from the base station device 101e as the retransmission signal. Specifically, the resynchronization factor detecting unit 62e counts the number of not being able to detect the signal of the broadcast from the signal transmitted by the base station device 101e. The UL synchronization managing unit 63e manages the uplink synchronization state of the mobile station device 102e. In addition, the UL synchronization managing unit 63e instructs the signature selecting unit 59e to perform a random access for performing a synchronization update process by the mobile station device 102e.

The signature managing unit 59e selects a signature ID number which is used in the random access based on the instruction from the scheduling unit 53e. The signature managing unit 59e supplies the selected signature ID number to the preamble generating unit 58e. If the signature ID number is instructed from the scheduling unit 53e, the instructed signature ID number is supplied to the preamble generating unit 58e.

The preamble generating unit 58e generates the preamble based on the signature ID number selected by the signature selecting unit 59e, and supplies it to the DFT-S-OFDM modulating unit 52e.

In the first to fourth embodiments, the uplink synchronization deviation is detected. However, in the fifth embodiment, a downlink synchronization deviation is detected.

If the synchronization is deviated from in the downlink, the synchronization of the uplink is also deviated from, because the synchronization of the uplink refers to the downlink. Therefore, if the downlink synchronization is deviated from, the uplink synchronization deviation is determined as the uplink synchronization deviation state, and the mobile station performs a (contention-based) random access. In addition, the synchronization deviation state is equal to the state which needs a synchronization processing. In the mobile station device, the UL synchronization managing unit 62e determines whether or not the resynchronization process is necessary. The broadcast channel BCH of the downlink common control channel CCPCH is 20 ms. In other words, the broadcast channel BCH is transmitted 20 ms interval. Therefore, the downlink synchronization deviation is the state that the reception of a broadcast channel of the downlink common control channel CCPCH continuously fails.

Figure 18:
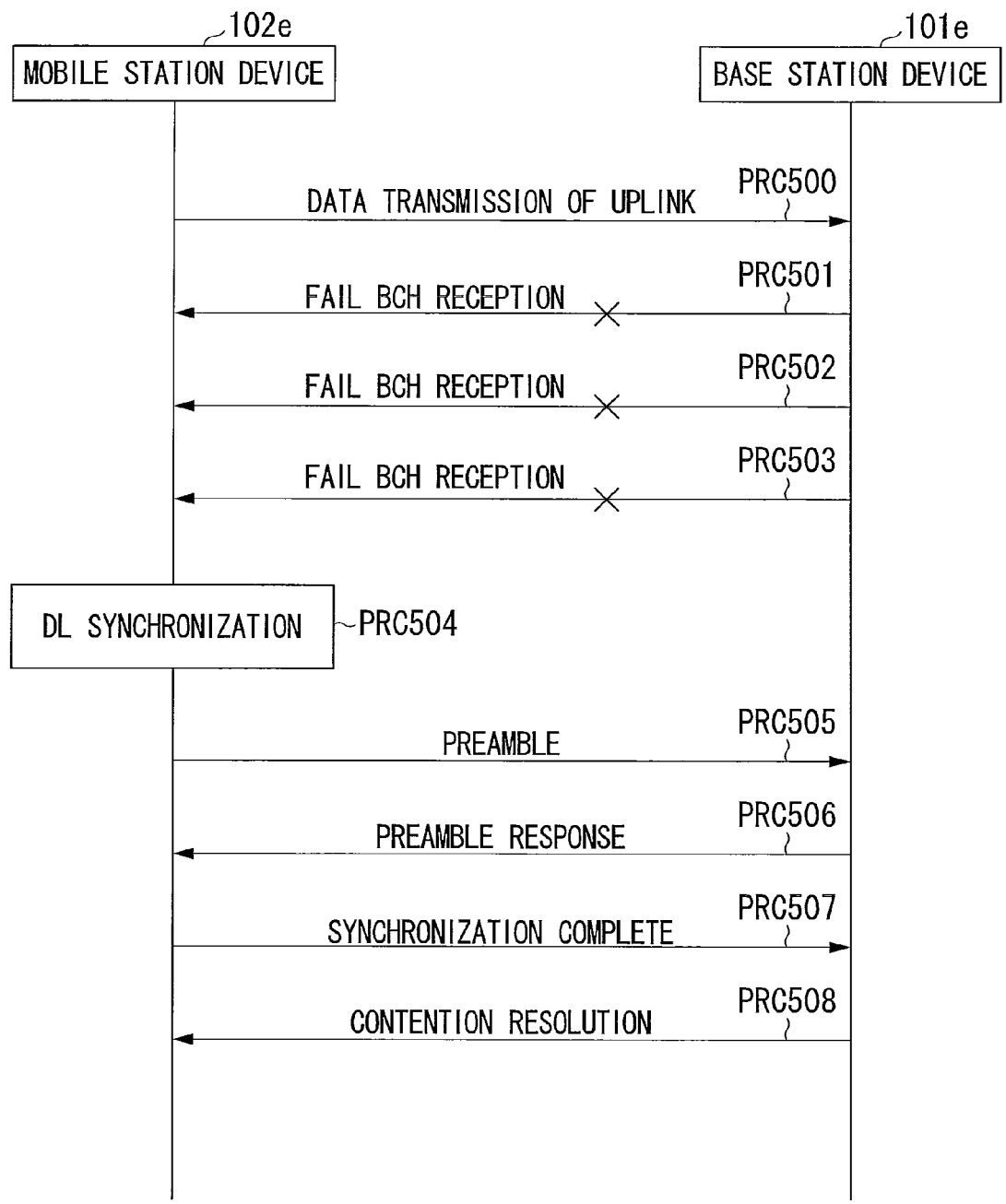
FIG. 18 is a sequence diagram showing communication processes of the communication system according to the fifth embodiment of the present invention.

The aforementioned controls method is described below in detail with reference to FIG. 18. As shown in FIG. 18, the mobile station device 102e transmits the uplink data (process PRC500), and regularly receives the broadcast channel from the base station device (processes PRC501 to PRC503). In FIG. 18, in processes PRC 501, PRC502 and PRC503, the reception of the broadcast channel fail. If the reception of the broadcast channel, the mobile station device 102e counts the number of the failure of reception.

If the mobile station device 102e receives the broadcast channel n times continuously, the mobile station device 102e performs a downlink synchronization. After establishes the downlink synchronization (process PRC504), and selects a signature, and transmits the preamble to the random access channel RACH (process PRC505).

If the preamble is detected, the base station device 101e detects the synchronization timing shift. Then, the mobile station device 102e performs a scheduling for transmitting the L2/L3 message to the mobile station device 102e, and transmits the preamble response message which includes the RA-RNTI and the synchronization timing shift information and the L2/L3 message of the scheduling information (process PRC506).

If the mobile station device 102e receives the preamble response, the mobile station device 102e performs a synchronization correction based on the synchronization timing shift information, and transmits the L2/L3 message which indicates the synchronization is updated (process PRC507). If the base station device 101e receives the L2/L3 message, the base station device 101e transmits the contention resolution to the mobile station device 102e (process PRC508). If the mobile station device 102e receives the contention resolution, the data transmission and the data reception between the base station device and the mobile station device are resumed.

Figure 19:
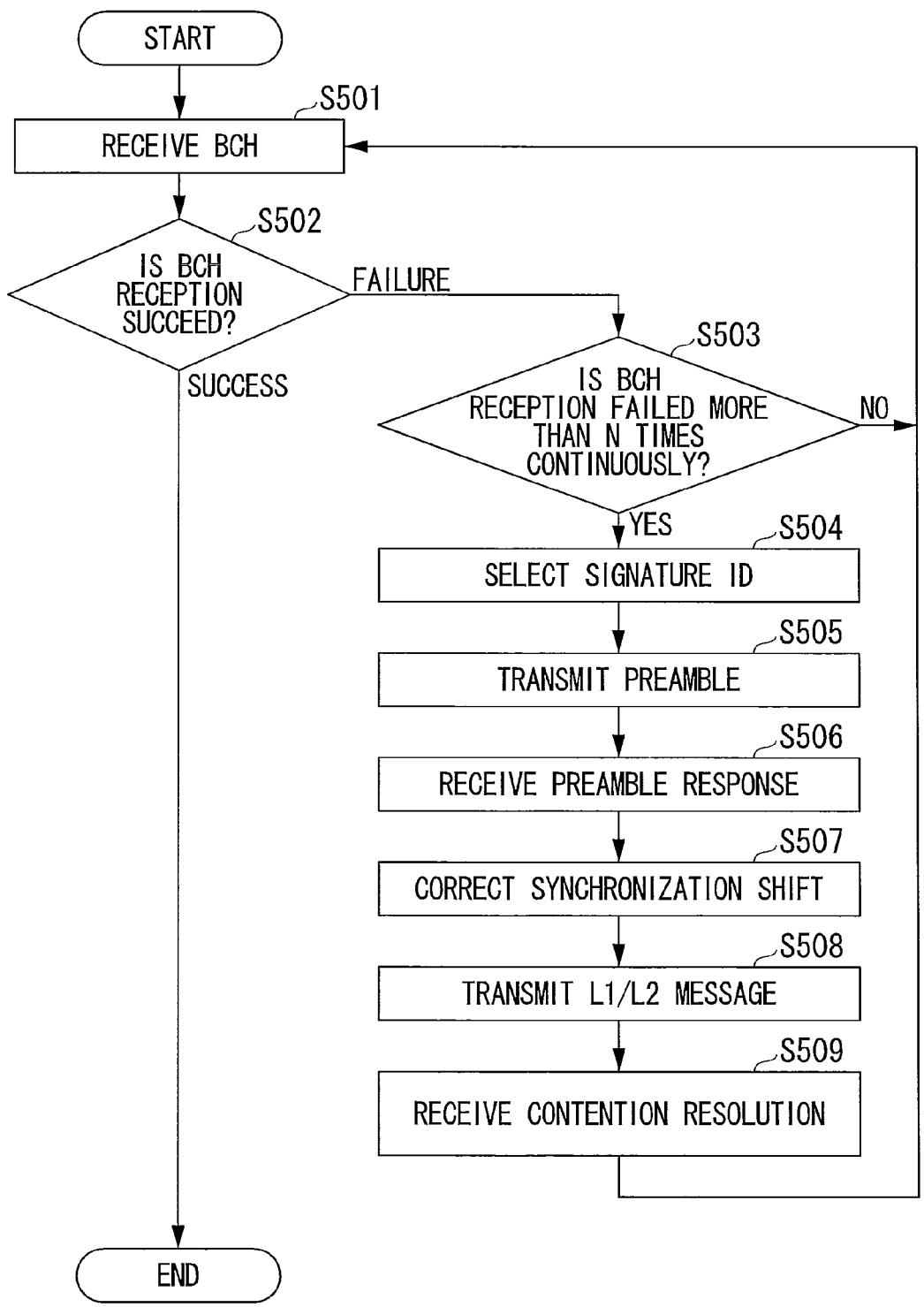
FIG. 19 is a flowchart showing processes of the base station device of the communication system according to the fifth embodiment of the present invention.
Figure 20:
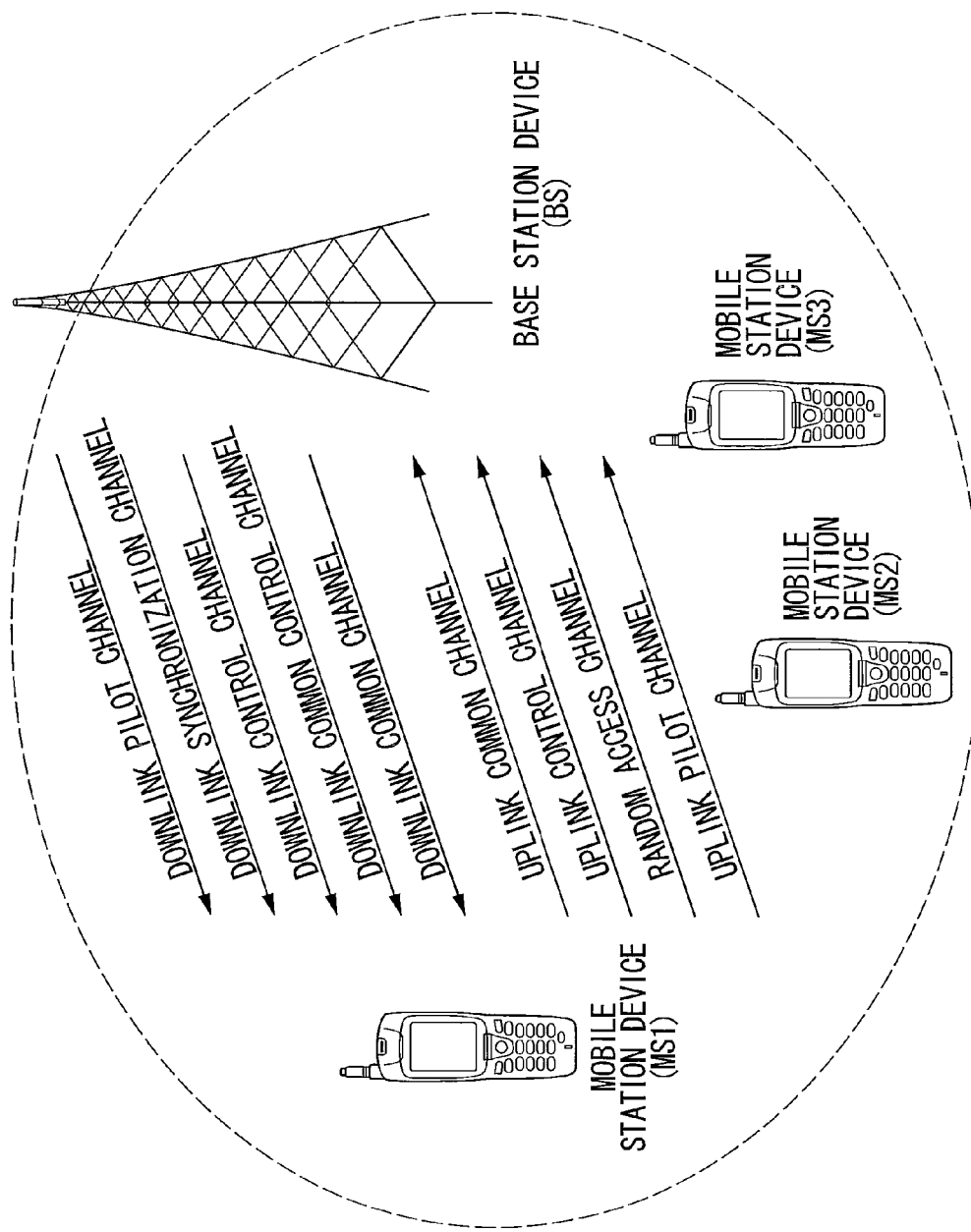
FIG. 20 is an explanation diagram of channel configurations of SUTRA.
Figure 21:
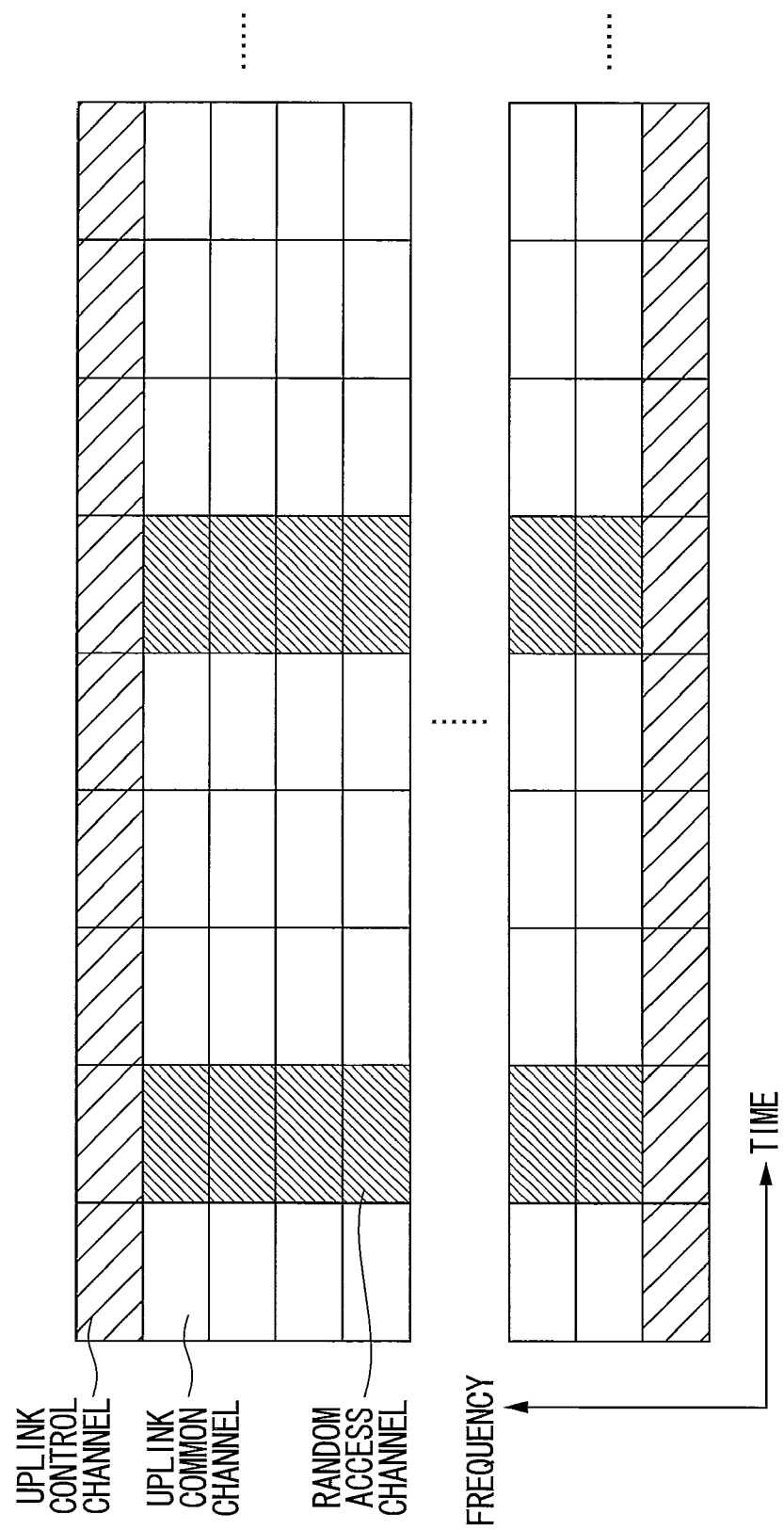
FIG. 21 is an explanation diagram of random access channel of uplink of E-UTRA.
Figure 22:
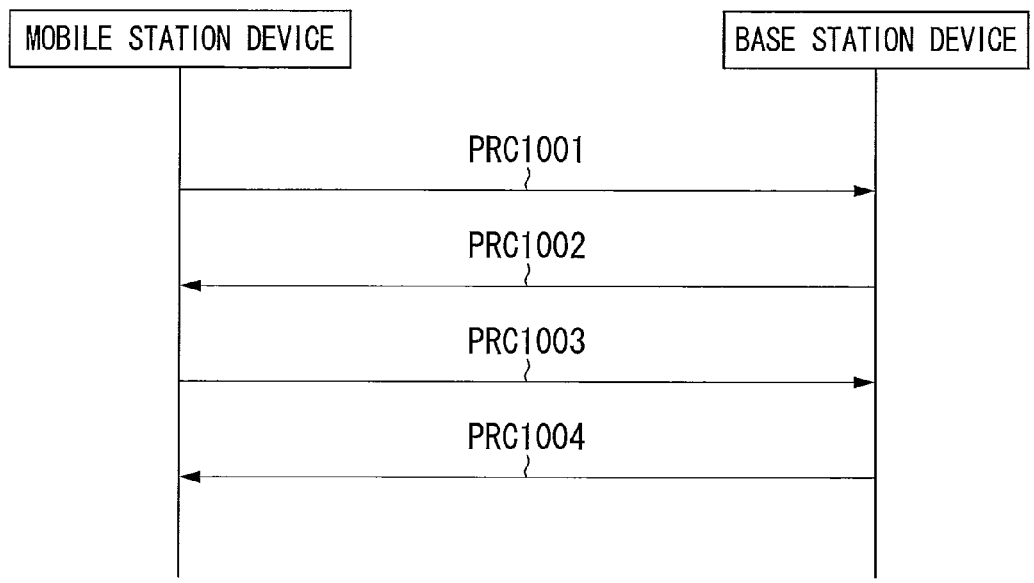
FIG. 22 is an explanation diagram of processes of contention random access of non-synchronization random access of E-UTRA.
Figure 23:
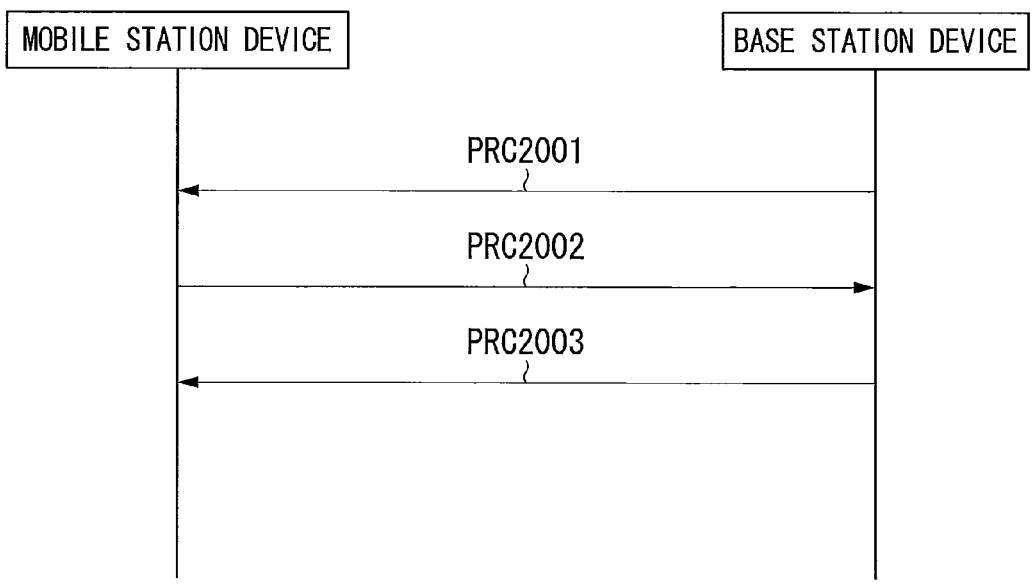
FIG. 23 is an explanation diagram of processes of non-contention random access of non-synchronization random access of E-UTRA.
Figure 24:
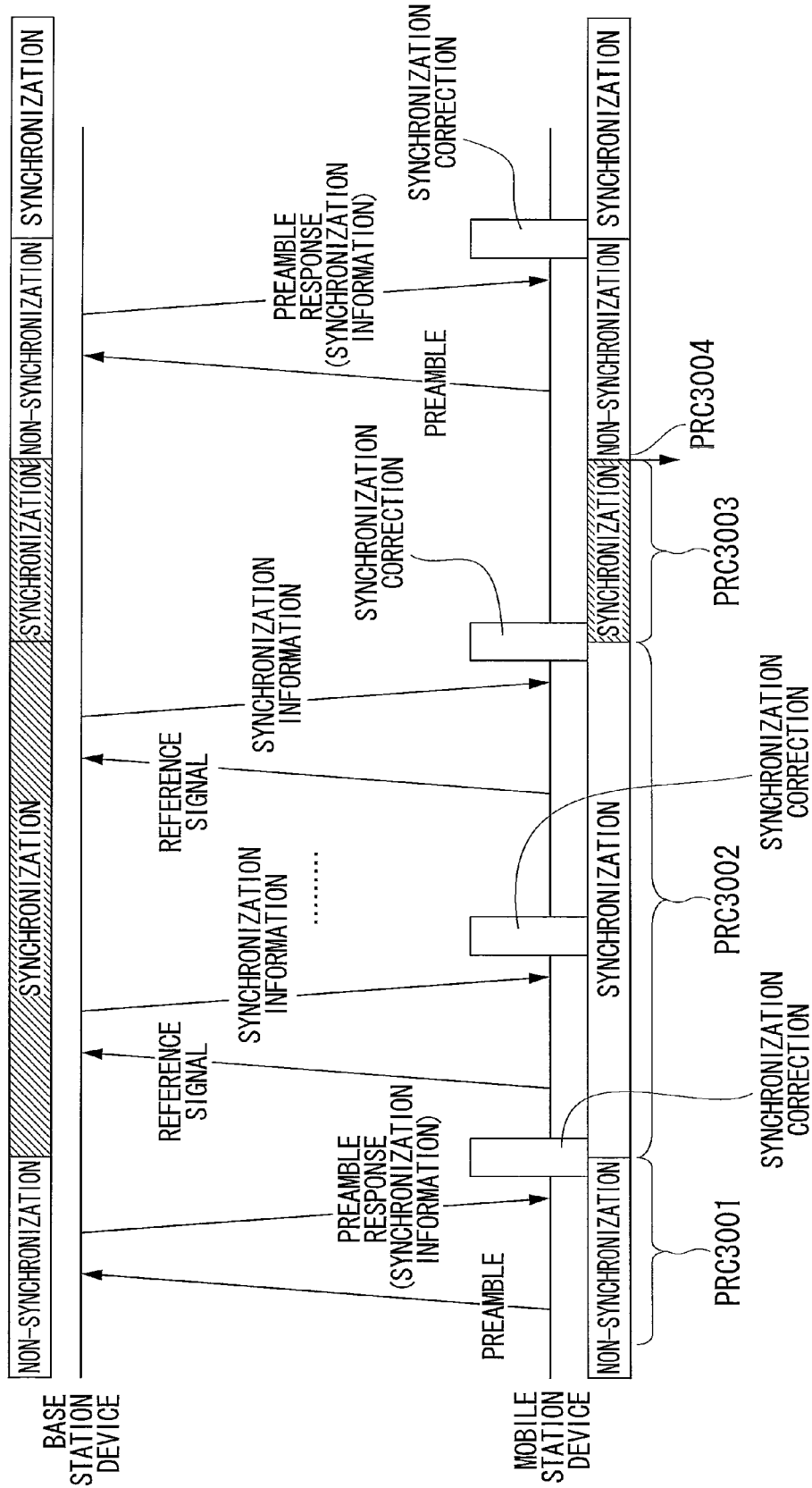
FIG. 24 is an explanation diagram of state transition of each synchronization establishment, synchronization maintenance and a synchronization deviation of uplink of E-UTRA.
Figure 25:
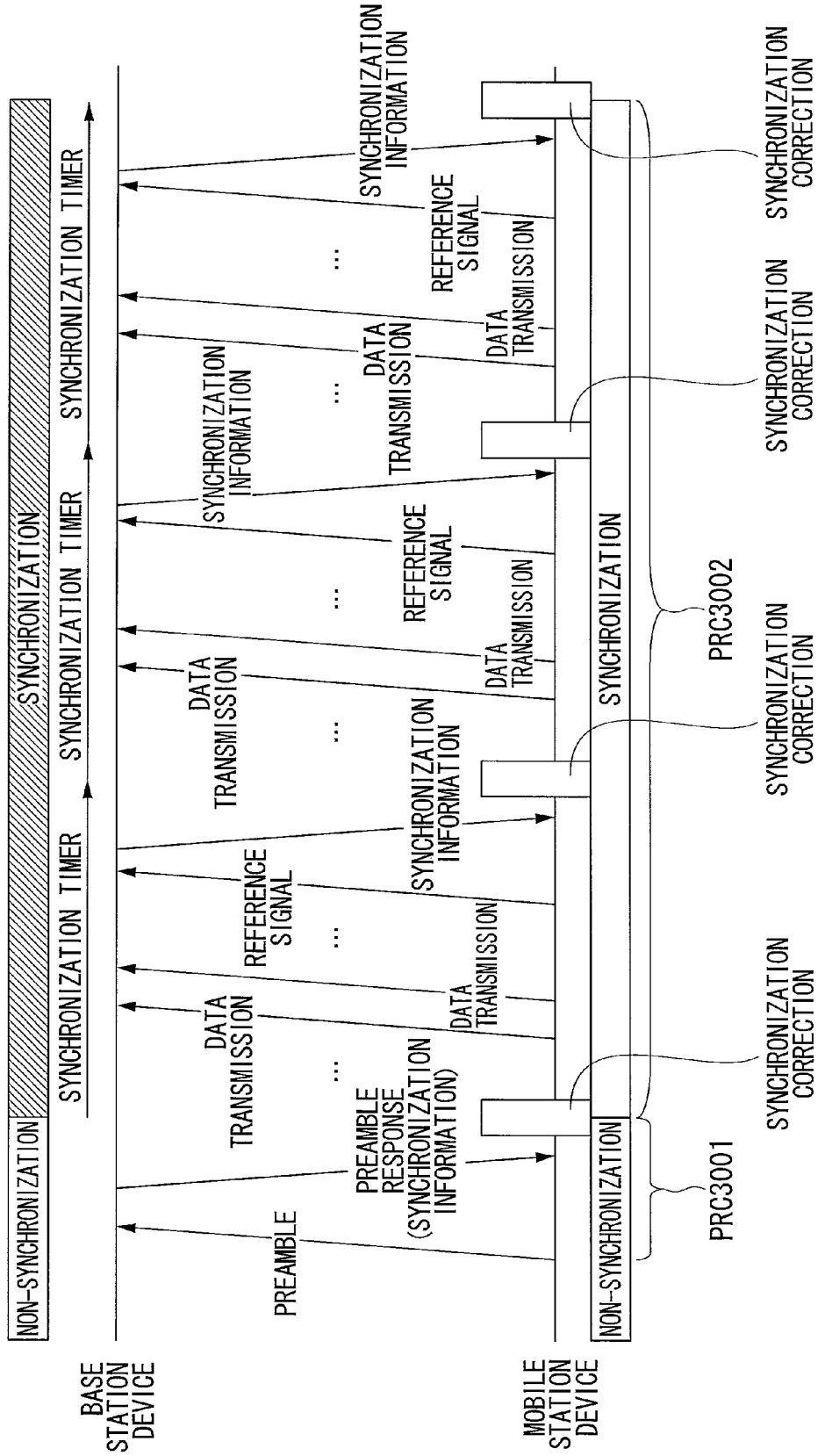
FIG. 25 is an explanation diagram of synchronization maintenance of uplink of E-UTRA.
Figure 26:
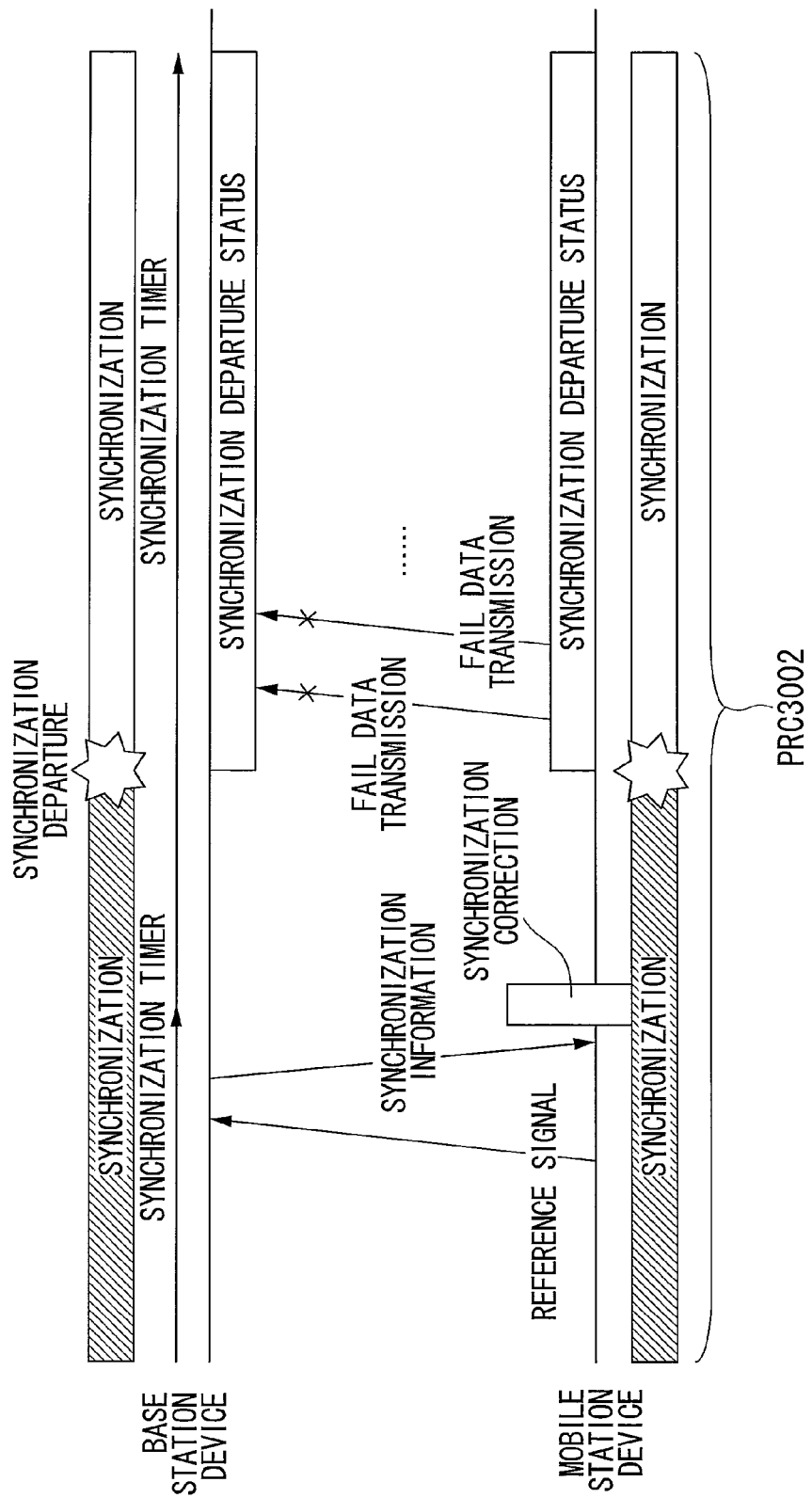
FIG. 26 is an explanation diagram of synchronization deviation of uplink of E-UTRA.

FIG. 19 is a flowchart showing aforementioned processes of the mobile station device 102e. The downlink broadcast channel is received (step S501), and a CRC checking of the broadcast channel is performed, and it is determined whether the reception is a success or failure (step S502). If the reception is a success, the reception process is maintained.

If the reception is failure, the number of reception failures is counted. Then, it is determined whether or not the continuous number of the reception failure is over n times (step S503). If a continuous number of the reception failures is less than n times, the reception process is maintained.

If the continuous number of reception failures is over n times, the synchronization process of the downlink is performed. After the downlink synchronization is established, a signature is selected (step S504), the preamble is transmitted to the random access channel RACH (step S505). Then, the reception of the preamble response is waited. If the preamble response is received (step S506), the synchronization correction is performed using the synchronization timing shift information which is included in the preamble response (step S507), the L2/L3 message which indicates the synchronization is updated is generated, the L2/L3 message is transmitted to the base station device 101e (step S508). The reception of the contention resolution is waited. After the contention resolution is received, the data transmission is resumed (step S509). Next, the reception of the broadcast channel BCH is performed (step S501).

In addition, in the fifth embodiment, the downlink synchronization deviation (synchronization deviation of the uplink) is detected based on the reception condition of the downlink common control channel CCPCH. However, the downlink synchronization deviation (synchronization deviation of the uplink) may be detected based on the reception condition of the data of the mobile station transmitted in the downlink common channel PDSCH. In addition, the downlink synchronization deviation may be detected based on the reception condition of the downlink pilot channel DPiCH. In this case, the downlink synchronization deviation may be detected by continuously failing to receive the downlink pilot channel DPiCH. In addition, the downlink synchronization may be measured by the downlink pilot channel DPiCH or the downlink synchronization channel DSCH, and the downlink synchronization may be determined if the synchronization deviation quantity is over a predetermined quantity. In the fourth and fifth embodiments, in spite of the synchronization maintenance state of the mobile station device, the synchronization deviation is detected, and the synchronization signal is transmitted to base station device. Therefore, if the mobile station device in the synchronization maintenance state becomes the synchronization deviation, it is possible to recover the synchronization early. In addition, the base station device is able to detect the synchronization deviation because the mobile station device transmits the synchronization signal, and the synchronization timer for transmitting the synchronization information is stopped (or reset).

Moreover, in each of the above described embodiments, it is also possible to control the base station device and the mobile station device by recording on a computer-readable recording medium a program which realizes the functions or a portion of the functions of each section of the base station device (see FIG. 1, FIG. 6, FIG. 9, FIG. 12) and each section of the mobile station device (see FIG. 3, FIG. 13, FIG. 17) of the first through fifth embodiments, and by causing this program recorded on a recording medium to be read and executed by a computer system. Note that, here, 'computer system' includes the OS and hardware such as peripheral devices and the like.

Moreover, 'computer readable recording medium' refers to a storage medium such as a portable medium such as a flexible disc, a magneto-optical disc, a ROM, a CD-ROM, or a hard disc incorporated in a computer system or the like. Furthermore, 'computer readable recording medium' also includes devices that hold a program dynamically for short periods of time such as communication lines when the program is transmitted via a network such as the Internet or via a communication circuit such as a telephone line, and includes devices which hold a program for a fixed period of time such as the volatile memory incorporated in computer systems which form the servers and clients in the case of the communication lines or networks described above. The above described program may realize a portion of the above described functions or may realize the above described functions in combination with a program which has already been recorded on a computer system.

Embodiments of this invention have been described in detail above with reference made to the drawings, however, the specific structure of this invention is not limited to these embodiments and other designs and the like are also included insofar as they do not depart from the spirit or scope of this invention.

INDUSTRIAL APPLICABILITY

The present invention provides a base station device, a mobile station device, a communication system and a communication method which makes it possible to detect a synchronization deviation early by the base station device or the mobile station device, and recovering from the synchronization state to the synchronization state early, if an uplink synchronization is deviated.

The invention claimed is:

1. A mobile station device which communicates with a base station device, the mobile station device comprising:
    a transmission/reception unit configured to
        transmit data to the base station device on dedicated channels assigned to the mobile station,
        receive a response from the base station device, and
        retransmit the data on the dedicated channels in case that the response of the base station device for the data is a predetermined response; and
    a random access performing section configured not to retransmit the data on dedicated channels but to perform random access on a random access channel that is a non-dedicated channel in case that the predetermined response is detected over predetermined times.

2. The mobile station device according to claim 1, wherein the predetermined response is a Negative Acknowledgment (NACK).

3. A communication method of a mobile station device, the communication method comprising:
    transmitting data to a base station device on dedicated channels assigned to the mobile station;
    receiving a response from the base station device;
    retransmitting the data on the dedicated channels in case that the response of the base station device for the data is predetermined response; and
    performing random access on a random access channel that is a non-dedicated channel, without transmission of the data on the dedicated channels, in case that the predetermined response is detected over predetermined times.

* * * * *